United States Patent
Proudler et al.

(10) Patent No.: US 7,194,623 B1
(45) Date of Patent: Mar. 20, 2007

(54) DATA EVENT LOGGING IN COMPUTING PLATFORM

(75) Inventors: Graeme John Proudler, Stoke (GB); Boris Balacheff, Keynsham (GB); Siani Lynne Pearson, Westbury-on-Trym (GB); David Chan, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/979,902

(22) PCT Filed: May 25, 2000

(86) PCT No.: PCT/GB00/02004

§ 371 (c)(1),
(2), (4) Date: Nov. 27, 2001

(87) PCT Pub. No.: WO00/73880

PCT Pub. Date: Dec. 7, 2000

(30) Foreign Application Priority Data

May 28, 1999 (EP) .................................. 99304165

(51) Int. Cl.
*H04L 9/00* (2006.01)
(52) U.S. Cl. .................... 713/164; 726/17; 726/21; 726/30; 718/100; 713/169; 713/193; 710/261; 710/266
(58) Field of Classification Search ................ 713/200, 713/165, 164; 705/51; 710/261, 244; 726/22
See application file for complete search history.

(56) References Cited

U.S. PATENT DOCUMENTS

| | | | |
|---|---|---|---|
| 5,032,979 A | 7/1991 | Hecht et al. ................ 364/200 |
| 5,144,660 A * | 9/1992 | Rose ........................... 713/200 |
| 5,283,828 A | 2/1994 | Saunders et al. ............ 713/192 |
| 5,341,422 A | 8/1994 | Blackledge et al. ........... 726/5 |
| 5,359,659 A | 10/1994 | Rosenthal ..................... 380/4 |
| 5,361,359 A | 11/1994 | Tajalli et al. ............... 395/700 |
| 5,404,532 A | 4/1995 | Allen et al. ................. 395/700 |

(Continued)

FOREIGN PATENT DOCUMENTS

CA  2187855  6/1997

(Continued)

OTHER PUBLICATIONS

U.S. Appl. No. 09/979,903, filed Nov. 27, 2001, Proudler et al.

(Continued)

*Primary Examiner*—Gilberto Barron
*Assistant Examiner*—Shewaye Gelagay
(74) *Attorney, Agent, or Firm*—Ladas & Parry LLP

(57) ABSTRACT

There is disclosed a computer entity having a trusted component which compiles an event log for events occurring on a computer platform. The event log contains event data of types which are pre-specified by a user by inputting details through a dialogue display generated by the trusted component. Items which can be monitored include data files, applications drivers and the like. The trusted component operates through a monitoring agent which may be launched onto the computer platform. The monitoring agent may be periodically interrogated to make sure that it is operating correctly and responding to interrogations by the trusted component.

21 Claims, 15 Drawing Sheets

U.S. PATENT DOCUMENTS

| | | | |
|---|---|---|---|
| 5,421,006 A | 5/1995 | Jablon et al. | 395/575 |
| 5,440,723 A | 8/1995 | Arnold et al. | 395/181 |
| 5,448,045 A | 9/1995 | Clark | 235/382 |
| 5,491,750 A | 2/1996 | Bellare et al. | 713/155 |
| 5,511,184 A * | 4/1996 | Lin | 710/261 |
| 5,572,590 A | 11/1996 | Chess | 380/4 |
| 5,619,571 A | 4/1997 | Sandstrom et al. | 380/4 |
| 5,701,343 A * | 12/1997 | Takashima et al. | 705/51 |
| 5,774,717 A | 6/1998 | Porcaro | 707/202 |
| 5,809,145 A | 9/1998 | Slik et al. | 380/25 |
| 5,815,702 A | 9/1998 | Kannan et al. | 712/244 |
| 5,819,261 A | 10/1998 | Takahashi et al. | 707/3 |
| 5,841,868 A | 11/1998 | Helbig | 235/380 |
| 5,841,869 A | 11/1998 | Merkling et al. | 713/164 |
| 5,844,986 A | 12/1998 | Davis | 380/4 |
| 5,890,142 A * | 3/1999 | Tanimura et al. | 706/12 |
| 5,892,900 A | 4/1999 | Ginter et al. | 726/26 |
| 5,892,902 A | 4/1999 | Clark | 726/5 |
| 5,937,159 A | 8/1999 | Meyers | 713/201 |
| 5,940,513 A * | 8/1999 | Aucsmith et al. | 713/187 |
| 5,966,732 A | 10/1999 | Assaf | 711/170 |
| 6,021,510 A | 2/2000 | Nachenberg | 714/38 |
| 6,038,667 A | 3/2000 | Helbig | 726/16 |
| 6,081,894 A | 6/2000 | Mann | 713/188 |
| 6,091,956 A | 7/2000 | Hollenberg | 455/456.5 |
| 6,098,133 A | 8/2000 | Summers et al. | 710/107 |
| 6,115,819 A | 9/2000 | Anderson | 726/20 |
| 6,253,324 B1 | 6/2001 | Field et al. | 713/187 |
| 6,253,349 B1 | 6/2001 | Maeda et al. | 714/799 |
| 6,266,774 B1 * | 7/2001 | Sampath et al. | 713/201 |
| 6,289,462 B1 | 9/2001 | McNabb et al. | 713/201 |
| 6,327,652 B1 | 12/2001 | England et al. | 713/2 |
| 6,330,670 B1 | 12/2001 | England et al. | 713/2 |
| 6,374,250 B2 | 4/2002 | Ajtai et al. | 707/701 |
| 6,405,318 B1 * | 6/2002 | Rowland | 713/200 |
| 6,507,909 B1 | 1/2003 | Zurko et al. | 713/164 |
| 6,510,418 B1 | 1/2003 | Case et al. | 705/26 |
| 6,529,143 B2 | 3/2003 | Mikkola et al. | 340/995.1 |
| 6,529,728 B1 | 3/2003 | Pfeffer et al. | 455/418 |
| 6,609,199 B1 | 8/2003 | DeTreville | 713/172 |
| 6,650,902 B1 | 11/2003 | Richton | 455/456.3 |
| 6,678,833 B1 | 1/2004 | Grawrock | 713/401 |
| 6,694,434 B1 | 2/2004 | McGee et al. | 713/189 |
| 6,697,944 B1 | 2/2004 | Jones et al. | 713/168 |
| 6,757,824 B1 | 6/2004 | England | 713/156 |
| 6,799,270 B1 | 9/2004 | Bull et al. | 713/153 |
| 6,853,988 B1 | 2/2005 | Dickinson et al. | 705/75 |
| 6,868,406 B1 | 3/2005 | Ogg et al. | 705/153 |
| 6,889,325 B1 | 5/2005 | Sipman et al. | 713/176 |
| 6,948,073 B2 | 9/2005 | England et al. | 380/201 |
| 2001/0037450 A1 | 11/2001 | Metlitski et al. | 713/152 |
| 2001/0051515 A1 | 12/2001 | Rygaard | 455/410 |
| 2002/0012432 A1 | 1/2002 | England et al. | 380/231 |
| 2002/0023212 A1 | 2/2002 | Proudler | 713/164 |
| 2002/0095454 A1 | 7/2002 | Reed et al. | 709/201 |
| 2002/0184488 A1 | 12/2002 | Amini et al. | 713/153 |
| 2003/0018892 A1 | 1/2003 | Tello | 713/164 |
| 2003/0037237 A1 | 2/2003 | Abgrall et al. | 713/166 |

FOREIGN PATENT DOCUMENTS

| | | |
|---|---|---|
| EP | 0 304 033 A2 | 2/1989 |
| EP | 0 580 350 A1 | 1/1994 |
| EP | 0 825 511 A2 | 2/1998 |
| EP | 0 849 657 A1 | 6/1998 |
| EP | 0 465 016 B1 | 12/1998 |
| EP | 0 895 148 A1 | 2/1999 |
| EP | 2 336 918 | 11/1999 |
| EP | 1 030 237 A1 | 8/2000 |
| EP | 1 056 014 A1 | 11/2000 |
| GB | 2 353 885 A | 3/2001 |
| JP | 2001-0016655 | 1/2001 |
| WO | 93/25024 | 12/1993 |
| WO | 94/11967 | 5/1994 |
| WO | 95/24696 | 9/1995 |
| WO | 95/27249 | 10/1995 |
| WO | WO 95/27249 * | 10/1995 |
| WO | 97/29416 | 8/1997 |
| WO | 98/26529 | 6/1998 |
| WO | 98/36517 | 8/1998 |
| WO | 98/40809 | 9/1998 |
| WO | 98/45778 | 10/1998 |
| WO | WO 98/45778 * | 10/1998 |
| WO | 00/31644 | 6/2000 |
| WO | 00/48062 | 8/2000 |
| WO | 00/48063 | 8/2000 |
| WO | 00/54125 | 9/2000 |
| WO | 00/54126 | 9/2000 |
| WO | 00/73913 A1 | 12/2000 |
| WO | 01/23980 | 4/2001 |

OTHER PUBLICATIONS

U.S. Appl. No. 10/080,476, filed Feb. 22, 2002, Proudler et al.
U.S. Appl. No. 10/080,477, filed Feb. 22, 2002, Brown et al.
U.S. Appl. No. 10/080,478, filed Feb. 22, 2002, Pearson et al.
U.S. Appl. No. 10/080,479, filed Feb. 22, 2002, Pearson et al.
U.S. Appl. No. 10/194,831, filed Jul. 11, 2002, Chen et al.
U.S. Appl. No. 10/206,812, filed Jul. 26, 2002, Proudler.
U.S. Appl. No. 10/208,718, filed Jul. 29, 2002, Chen et al.
Anderson, R., et al., "Tamper Resistance—a Cautionary Note," *ISENIX Association, Second USENIX Workshop on Electronic Commerce*, pp. 1-11 (Nov. 18-21, 1996).
Naor, M., et al., "Secure and Efficient Metering," Internet: <http://citeseer.nj.com/naor98secure.html> Sections 1-1.3 (1998).
Yee, B., "Using Secure Coprocessors," Doctoral thesis—Carnegie Mellon University, pp. 1-94 (May 1994).
"HP Virtualvault: Trusted Web-server Platform Product Brief," Internet: <http://www.hp.com/security/products/virtualvault/papers/brief_4.0/> pp. 1-6.
"NIST Announces Technical Correction to Secure Hash Standard," Internet: <http://www.nist.gov/public_affairs/releases/hashstan.htm> pp. 1-2 (Oct. 24, 2002).
"Secure Computing with JAVA™ : Now and the Future," Internet: <http://java.sun.com/marketing/collateral/security.html> pp. 1-29 (Apr. 2, 2002).
"System for Detecting Undesired Alteration of Software," *IBM Technical Disclosure Bulletin*, vol. 32, No. 11, pp. 48-50, (Apr. 1990).
Bontchev, V., "Possible Virus Attacks Against Integrity Programs and How to Prevent Them," *Virus Bulletin Conference*, pp. 131-141 (Sep. 1992).
Radai, Y., "Checksumming Techniques for Anti-Viral Purposes," *Virus Bulletin Conference*, pp. 39-68 (Sep. 1991).
Intel, "Wired for Management Baseline specification v2.0," *Boot Integrity Services Application Programming Interface Version 1.0*, 64 pages (Dec. 28, 1998).
"Information technology-Security techniques-Entity Authentication—Part 3: Mechanisms using digital signature techniques," *ISO/IEC 9798-3*, 6 pages (1998).
"Information technology-Security techniques-Key management—Part 3: Mechanisms using asymmetric techniques," *ISO/IEC 11770-3*, pp. 1-23 and Annexes A-E (1999).
The Trusted Computing Platform Alliance, "Building a Foundation of Trust in the PC," 9 pages, located at Internet address <www.trustedpc.org/home/home.html> (Jan. 2000).
Trusted Computing Platform Alliance, Main Specification Version 1.0, 284 pages (Jan. 25, 2001).
Schneier, B., et al., "Applied Cryptography, Second Edition", John Wiley and Sons, Inc. pp. 34-38.

* cited by examiner

DATA EVENT LOGGING IN COMPUTING PLATFORM

CROSS REFERENCE TO RELATED APPLICATIONS

The subject matter of the present application may also be related to the following U.S. Patent Applications: "Data Integrity Monitoring in Trusted Computing Entity," Ser. No. 09/979,903, filed Nov. 27, 2001; "Information System," Ser. No. 10/080,476, filed Feb. 22, 2002; "Trusted Computing Environment," Ser. No. 10/080,477, filed Feb. 22, 2002; "Method of and Apparatus for Investigating Transactions in a Data Processing Environment," Ser. No. 10/080,478, filed Feb. 22, 2002; "Method of and Apparatus for Ascertaining the Status of a Data Processing Environment," Ser. No. 10/080,479, filed Feb. 22, 2002; "Trusted Platform Evaluation," Ser. No. 10/194,831, filed Jul. 11, 2002; "Privacy of Data on a Computer Platform," Ser. No. 10/206,812, filed Jul. 26, 2002; and "Method and Apparatus for Locking an Application Within a Trusted Environment," Ser. No. 10/208,718, filed Jul. 29, 2002.

FIELD OF THE INVENTION

The present invention relates to security monitoring of computer platforms, and particularly, although not exclusively, to monitoring of events and operations occurring on data files, applications, drivers and like entities on a computer platform.

BACKGROUND TO THE INVENTION

Conventional prior art mass market computing platforms include the well-known personal computer (PC) and competing products such as the Apple Macintosh™, and a proliferation of known palm-top and laptop personal computers. Generally, markets for such machines fall into two categories, these being domestic or consumer, and corporate. A general requirement for a computing platform for domestic or consumer use is a relatively high processing power, Internet access features, and multi-media features for handling computer games. For this type of computing platform, the Microsoft Windows® '95 and '98 operating system products and Intel processors dominate the market.

On the other hand, for business use, there are a plethora of available proprietary computer platform solutions available aimed at organizations ranging from small businesses to multi-national organizations. In many of these applications, a server platform provides centralized data storage, and application functionality for a plurality of client stations. For business use, other key criteria are reliability, networking features, and security features. For such platforms, the Microsoft Windows NT 4.0™ operating system is common, as well as the Unix™ operating system.

With the increase in commercial activity transacted over the Internet, known as "e-commerce", there has been much interest in the prior art on enabling data transactions between computing platforms, over the Internet. However, because of the potential for fraud and manipulation of electronic data, in such proposals, fully automated transactions with distant unknown parties on a wide-spread scale as required for a fully transparent and efficient market place have so far been held back. The fundamental issue is one of trust between interacting computer platforms for the making of such transactions.

There have been several prior art schemes which are aimed at increasing the security and trustworthiness of computer platforms. Predominantly, these rely upon adding in security features at the application level, that is to say the security features are not inherently imbedded in the kernel of operating systems, and are not built in to the fundamental hardware components of the computing platform. Portable computer devices have already appeared on the market which include a smart card, which contains data specific to a user, which is input into a smart card reader on the computer. Presently, such smart cards are at the level of being add-on extras to conventional personal computers, and in some cases are integrated into a casing of a known computer. Although these prior art schemes go some way to improving the security of computer platforms, the levels of security and trustworthiness gained by prior art schemes may be considered insufficient to enable widespread application of automated transactions between computer platforms. Before businesses expose significant value transactions to electronic commerce on a widespread scale, they may require greater confidence in the trustworthiness of the underlying technology.

In the applicant's co-pending International Patent Applications 'Trusted Computing Platform' PCT/GB 00/00528, filed on 15 Feb. 2000, and 'Smartcard User Interface for Trusted Computing Platform' PCT/GB 00100752, filed on 3 Mar. 2000, the entire contents of which are incorporated herein by reference, there is disclosed a concept of a 'trusted computing platform' comprising a computing platform which has a 'trusted component' in the form of a built-in hardware and software component. Two computing entities each provisioned with such a trusted component, may interact with each other with a high degree of 'trust'. That is to say, where the first and second computing entities interact with each other the security of the interaction is enhanced compared to the case where no trusted component is present, because:

A user of a computing entity has higher confidence in the integrity and security of his/her own computer entity and in the integrity and security of the computer entity belonging to the other computing entity.

Each entity is confident that the other entity is in fact the entity which it purports to be.

Where one or both of the entities represent a party to a transaction, e.g. a data transfer transaction, because of the in-built trusted component, third party entities interacting with the entity have a high degree of confidence that the entity does in fact represent such a party.

The trusted component increases the inherent security of the entity itself, through verification and monitoring processes implemented by the trusted component.

The computer entity is more likely to behave in the way it is expected to behave.

Prior art computing platforms have several problems which need to be overcome in order to realize the potential of the applicants' above disclosed trusted component concept. In particular, The operating status of a computer system or platform and the status of the data within the platform or system is dynamic and difficult to predict. It is difficult to determine whether a computer platform is operating correctly because the state of the computer platform and data on the platform is constantly changing and the computer platform itself may be dynamically changing.

From a security point of view, commercial computer platforms, in particular client platforms, are often deployed in environments which are vulnerable to unauthorized modification. The main areas of vulnerability include modification by software loaded by a user, or by software loaded via a network connection. Particularly, but not exclusively, conventional computer platforms may be vulnerable to attack by virus programs, with varying degrees of hostility.

Computer platforms may be upgraded or their capabilities extended or restricted by physical modification, i.e. addition or deletion of components such as hard disk drives, peripheral drivers and the like.

It is known to provide certain security features in computer systems, embedded in operating software. These security features are primarily aimed at providing division of information within a community of users of the system.

In the known Microsoft Windows NT™ 4.0 operating system, there also exists a monitoring facility called "system log event viewer" in which a log of events occurring within the platform is recorded into an event log data file which can be inspected by a system administrator using the windows NT operating system software. This facility goes someway to enabling a system administrator to security monitor pre-selected events. The event logging function in the Windows NT™ 4.0 operating system is an example of system monitoring.

However, in terms of overall security of a computer platform, a purely software based system is vulnerable to attack, for example by viruses. The Microsoft Windows NT™ 4.0 software includes a virus guard software, which is preset to look for known viruses. However, virus strains are developing continuously, and the virus guard software will not guard against unknown viruses.

Further, prior art monitoring systems for computer entities focus on network monitoring functions, where an administrator uses network management software to monitor performance of a plurality of network computers. Also, trust in the system does not reside at the level of individual trust of each hardware unit of computer platform in a system.

SUMMARY OF THE INVENTION

Specific implementations of the present invention provide a computer platform having a trusted component which is physically and logically distinct from a computer platform. The trusted component has the properties of unforgability, and autonomy from the computer platform with which it is associated. The trusted component monitors the computer platform and thereby may provide a computer platform which is monitored on an individual basis at a level beneath a network monitoring or system monitoring level. Where a plurality of computer platforms are networked or included in the system, each computer platform may be provided with a separate corresponding respective trusted component.

Specific implementations of the present invention may provide a secure method of monitoring events occurring on a computer platform, in a manner which is incorruptible by alien agents present on the computer platform, or by users of the computer platform, in a manner such that if any corruption of the event log takes place, this is immediately apparent.

According to a first aspect of the present invention there is provided a computer entity comprising a computer platform comprising a data processor and at least one memory device; and a trusted component, said trusted component comprising a data processor and at least one memory device; wherein said data processor and said memory of said trusted component are physically and logically distinct from said data processor and memory of said computer platform; and means for monitoring a plurality of events occurring on said computer platform.

Preferably said monitoring means comprises a software agent operating on said computer platform, for monitoring at least one event occurring on said computer platform, and reporting said event to said trusted component. Said software agent may comprise a set of program code normally resident in said memory device of said trusted component, said code being transferred into said computer platform for performing monitoring functions on said computer platform.

Preferably said trusted component comprises an event logging component for receiving data describing a plurality of events occurring on said computer platform, and compiling said event data into a secure event data. Preferably said event logging component comprises means for applying a chaining function to said event data to produce said secure event data.

Selections of events and entities to be monitored may be selected by a user by operating a display interface for generating an interactive display comprising: means for selecting an entity of said computer platform to be monitored; and means for selecting at least one event to be monitored.

The monitoring means may further comprise prediction means for predicting a future value of at least one selected parameter.

Preferably the computer entity further comprises a confirmation key means connected to said trusted component, and independent of said computer platform, for confirming to said trusted component an authorisation signal of a user.

Entities to be monitored may include a data file; an application; or a driver component.

According to a second aspect of the present invention there is provided a computer entity comprising a computer platform having a first data processor and a first memory device; and a trusted monitoring component comprising a second data processor and a second memory device, wherein said trusted monitoring component stores an agent program resident in said second memory area, wherein said agent program is copied to said first memory area for performing functions on behalf of said trusted component, under control of said first data processor.

According to a third aspect of the present invention there is provided a computer entity comprising a computer platform comprising a first data processor and a first memory device; a trusted monitoring component comprising a second data processor and a second memory device; a first computer program resident in said first memory area and operating said first data processor, said first computer program reporting back events concerning operation of said computer platform to said trusted monitoring component; and a second computer program resident in said second memory area of said trusted component, said second program operating to monitor an integrity of said first program.

Said computer program may monitor an integrity of said first computer program by sending to said first computer program a plurality of interrogation messages, and monitoring a reply to said interrogation messages made by said first computer program. Preferably said interrogation message is sent in a first format, and returned in a second format, wherein said second format is a secure format.

According to a fourth aspect of the present invention there is provided a method of monitoring a computer platform comprising a first data processor and a first memory means, said method comprising the steps of reading event data describing events occurring on at least one logical or physical entity comprising said computer platform; securing said event data in a second data processing means having an associated second memory area, said second data processing means and said second memory area being physically and logically distinct from said first data processing means and said first memory area, such that said secured event data cannot be altered without such alteration being apparent.

A said event to be monitored may be selected from the set of events: copying of a data file; saving a data file; renaming a data file; opening a data file; overwriting a data file; modifying a data file; printing a data file; activating a driver device; reconfiguring a driver device; writing to a hard disk drive; reading a hard disk drive; opening an application; closing an application. A said entity to be monitored may be selected from the set: at least one data file stored on said computer platform; a driver device of said computer platform; an application program resident on said computer platform.

The entity may be continuously monitored over a pre-selected time period, or the entity may be monitored until such time as a pre-selected event occurs on the entity. The entity may be monitored for a selected event until a pre-determined time period has elapsed.

The invention includes a method of monitoring a computer platform comprising a first data processing means and a first memory means, said method comprising the steps of generating an interactive display for selecting at least one entity comprising said computer platform; generating a display of events which can be monitored; generating a display of entities of said computer platform; selecting at least one said entity; selecting at least one said event; and monitoring a said entity for a said event.

The invention includes a method of monitoring a computer platform comprising a first data processing means and first memory means, said method comprising the steps of storing a monitoring program in a second memory area, said second memory area being physically and logically distinct from said first memory area; transferring said monitoring program from said second memory area to said first memory area; monitoring at least one entity of said computer platform from within said computer platform; and reporting an event data from said monitoring program to said second data processor.

The invention includes a method of monitoring a computer platform comprising a first data processing and a first memory means, said method comprising the steps of monitoring at least one entity comprising said computer platform from within said computer platform; generating an event data describing a plurality of events occurring on said computer platform; reporting said event data to a second data processing means having an associated second memory means; and processing said event data into a secure format.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

Figure 1:
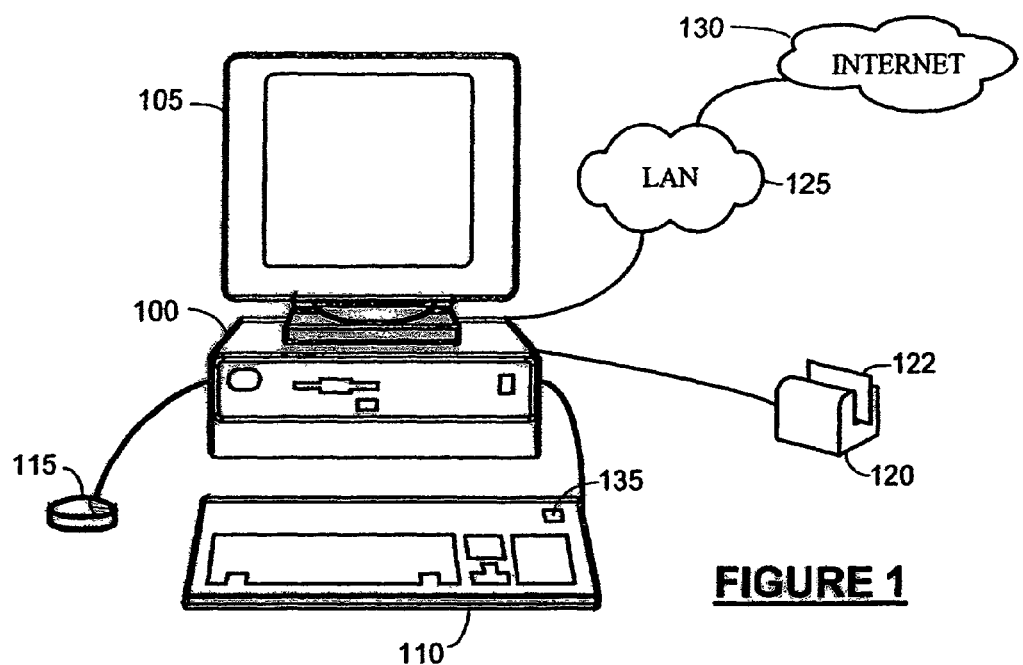
FIG. 1 is a diagram which illustrates a computer system suitable for operating in accordance with the preferred embodiment of the present invention.

There will now be described by way of example a best mode contemplated by the inventors for carrying out the invention, together with alternative embodiments. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific implementations of the present invention comprise a computer platform having a processing means and a memory means, and a monitoring component which is physically associated with the computer platform, and known herein after as a "trusted component" (or "trusted device") which monitors operation of the computer platform by collecting metrics data from the computer platform, and which is capable of verifying to other entities interacting with the computer platform, the correct functioning of the computer platform. Such a system is described in the applicant's copending International Patent Application entitled 'Trusted Computing Platform', No. PCT/GB 00/00528, filed on 15 Feb. 2000, the entire contents of which are incorporated herein by reference. A token device which may be personal to a human user of computer platform interacts with a trusted component associated with the computer platform to verify to the human user the trustworthiness of the computer platform. Appropriate token devices and systems are described in the applicant's copending International Patent Application No. PCT/GB 00/00752, entitled 'Smartcard User Interface for Trusted Computing Platform', filed on 3 Mar. 2000, the entire contents of which are incorporated herein by reference.

A user of a computing entity established a level of trust with the computer entity by use of such a trusted token device. The trusted token device is a personal and portable device having a data processing capability and in which the user has a high level of confidence. The trusted token device may perform the functions of:

verifying a correct operation of a computing platform in a manner which is readily apparent to the user, for example by audio or visual display;

challenging a monitoring component to provide evidence of a correct operation of a computer platform with which the monitoring component is associated; and establishing a level of interaction of the token device with a computing platform, depending on whether a monitoring component has provided satisfactory evidence of a correct operation of the computing entity, and withholding specific interactions with the computer entity if such evidence of correct operation is not received by the token device.

The token device may be requested to take an action, for example by an application resident on the computing platform, or by remote application, or alternatively the token device may initiate an action itself.

In this specification, the term "trusted" when used in relation to a physical or logical component, is used to mean that the physical or logical component always behaves in an expected manner. The behavior of that component is predictable and known. Trusted components have a high degree of resistance to unauthorized modification.

In this specification, the term 'computer entity' is used to describe a computer platform and a monitoring component.

In this specification, the term "computer platform" is used to refer to at least one data processor and at least one data storage means, usually but not essentially with associated communications facilities e.g. a plurality of drivers, associated applications and data files, and which may be capable of interacting with external entities e.g. a user or another computer platform, for example by means of connection to the internet, connection to an external network, or by having an input port capable of receiving data stored on a data storage medium, e.g. a CD ROM, floppy disk, ribbon tape or the like. The term "computer platform" encompasses the main data processing and storage facility of a computer entity.

The term 'pixmap', as used herein, is used broadly to encompass data defining either monochrome or colour (or greyscale) images. Whereas the term 'bitmap' may be associated with a monochrome image only, for example where a single bit is set to one or zero depending on whether a pixel is 'on' or 'off', 'pixmap' is a more general term, which encompasses both monochrome and colour images, where colour images may require up to 24 bits or more to define the hue, saturation and intensity of a single pixel.

By use of a trusted component in each computing entity, there is enabled a level of trust between different computing platforms. It is possible to query such a platform about its state, and to compare it to a trusted state, either remotely, or through a monitor on the computer entity. The information gathered by such a query is provided by the computing entity's trusted component which monitors the various parameters of the platform. Information provided by the trusted component can be authenticated by cryptographic authentication, and can be trusted.

The presence of the trusted component makes it possible for a piece of third party software, either remote or local to the computing entity to communicate with the computing entity in order to obtain proof of its authenticity and identity and to retrieve measured integrity metrics of that computing entity. The third party software can then compare the metrics obtained from the trusted component against expected metrics in order to determine whether a state of the queried computing entity is appropriate for the interactions which the third party software item seeks to make with the computing entity, for example commercial transaction processes.

This type of integrity verification between computing entities works well in the context of third party software communicating with a computing entity's trusted component, but does not provide a means for a human user to gain a level of trustworthy interaction with his or her computing entity, or any other computing entity which that person may interact with by means of a user interface.

In a preferred implementation described herein, a trusted token device is used by a user to interrogate a computing entity's trusted component and to report to the user on the state of the computing entity, as verified by the trusted component.

A "trusted platform" used in preferred embodiments of the invention will now be described. This is achieved by the incorporation into a computing platform of a physical trusted device whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. (Optionally the trusted device will refuse to provide evidence of identity if it itself was unable to verify correct operation of the platform.) The user receives the proof of identity and the identity metric, and compares them against values which it believes to be true. Those proper values are provided by the TP or another entity that is trusted by the user. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted device, therefore, preferably consists of one physical component that is tamper-resistant.

Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. Further discussion of appropriate techniques can be found at http://www.cl.cam.ac.uk/~mgk25/tamper.html. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

FIG. 1 illustrates a host computer system according to the preferred embodiment, in which the host computer is a Personal Computer, or PC, which operates under the Windows NT™ operating system. According to FIG. 1, the computer platform (also here termed host computer) 100 is connected to a visual display unit (VDU) 105, a keyboard 110, a mouse 115 and a smartcard reader 120, and a local area network (LAN) 125, which in turn is connected to the Internet 130. Herein, the smartcard reader is an independent unit, although it may be an integral part of the keyboard. In addition, the host computer has a trusted input device, in this case a trusted switch 135, which is integrated into the keyboard. The VDU, keyboard, mouse, and trusted switch can be thought of as the human/computer interface (HCI) of the host computer. More specifically, the trusted switch and the display, when operating under trusted control, as will be described, can be thought of as a 'trusted user interface'. FIG. 1 also illustrates a smartcard 122 for use in the present embodiment as will be described.

Figure 2:
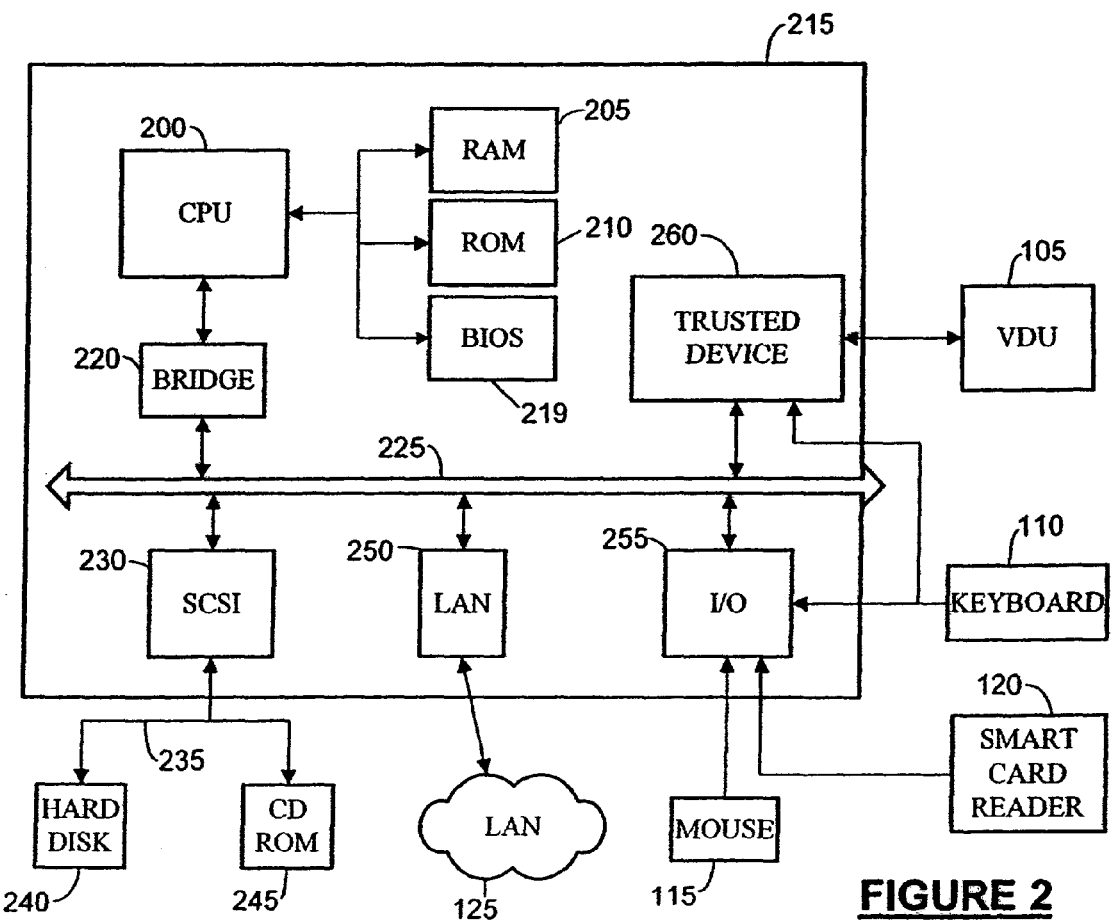
FIG. 2 is a diagram which illustrates a hardware architecture of a computer platform suitable for operating in accordance with the preferred embodiment of the present invention.

FIG. 2 shows a hardware architecture of the host computer of FIG. 1.

According to FIG. 2, the host computer 100 comprises a central processing unit (CPU) 200, or main processor, connected to main memory, which comprises RAM 205 and ROM 210, and to a BIOS memory 219 (which may be a reserved area of main memory) all of which are mounted on a motherboard 215 of the host computer 100. The CPU in this case is a Pentium™ processor. The CPU is connected via a PCI (Peripheral Component Interconnect) bridge 220 to a PCI bus 225, to which are attached the other main components of the host computer 100. The bus 225 comprises appropriate control, address and data portions, which will not be described in detail herein. For a detailed description of Pentium processors and PCI architectures, which is beyond the scope of the present description, the reader is referred to the book, "The Indispensable PC Hardware Handbook", 3rd Edition, by Hans-Peter Messmer, published by Addison-Wesley, ISBN 0-201-40399-4. Of course, the present embodiment is in no way limited to implementation using Pentium processors, Windows™ operating systems or PCI buses.

The other main components of the host computer 100 attached to the PCI bus 225 include: a SCSI (small computer system interface) adaptor connected via a SCSI bus 235 to a hard disk drive 240 and a CD-ROM drive 245; a LAN (local area network) adaptor 250 for connecting the host computer 100 to a LAN 125, via which the host computer 100 can communicate with other host computers (not shown), such as file servers, print servers or email servers, and the Internet 130; an IO (input/output) device 225, for attaching the keyboard 110, mouse 115 and smartcard reader 120; and a trusted device 260. The trusted device handles all standard display functions plus a number of further tasks, which will be described in detail below. 'Standard display functions' are those functions that one would normally expect to find in any standard host computer 100, for example a PC operating under the Windows NT™ operating system, for displaying an image associated with the operating system or application software. The significance of providing the function of a 'trusted display processor in the trusted device 260 will be described further below. It should be noted that the keyboard 110 has a connection to the IO device 255, as well as a direct connection to the trusted device 260.

All the main components, in particular the trusted display processor 260, are preferably also integrated onto the motherboard 215 of the host computer 100, although, sometimes, LAN adapters 250 and SCSI adapters 230 can be of the plugin type.

The computer entity can be considered to have a logical, as well as a physical, architecture. The logical architecture has a same basic division between the computer platform, and the trusted component, as is present with the physical architecture described in FIGS. 1 and 2 herein. That is to say, the trusted component is logically distinct from the computer platform to which it is physically related. The computer entity comprises a user space being a logical space which is physically resident on the computer platform (the first processor and first data storage means) and a trusted component space being a logical space which is physically resident on the trusted component. In the user space are one or a plurality of drivers, one or a plurality of applications programs, a file storage area; smart card reader; smart card interface; and a software agent which can perform operations in the user space and report back to trusted component. The trusted component space is a logical area based upon and physically resident in the trusted component, supported by the second data processor and second memory area of the trusted component. Monitor 105 receives images directly from the trusted component space. External to the computer entity are external communications networks e.g. the Internet, and various local area networks, wide area networks which are connected to the user space via the drivers (which may include one or more modem ports). An external user smart card inputs into smart card reader in the user space.

Typically, in a personal computer the BIOS program is located in a special reserved memory area, the upper 64K of the first megabyte do the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT (™), which is typically loaded into main memory from a hard disk drive (not shown).

Clearly, this change from the normal procedure requires a modification to the implementation of the industry standard, whereby the main processor 200 is directed to address the trusted device 260 to receive its first instructions. This change may be made simply by hard-coding a different address into the main processor 200. Alternatively, the trusted device 260 may be assigned the standard BIOS program address, in which case there is no need to modify the main processor configuration.

It is highly desirable for the BIOS boot block to be contained within the trusted device 260. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the trusted device 260 is a single, discrete component, it is envisaged that the functions of the trusted device 260 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 215, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

After system reset, the trusted device 260 performs a secure boot process to ensure that the operating system of the platform 100 (including the system clock and the display on the monitor) is running properly and in a secure manner. During the secure boot process, the trusted device 260 acquires an integrity metric of the computing platform 100.

The trusted device 260 can also perform secure data transfer and, for example, authentication between it and a smart card via encryption/decryption and signature/verification. The trusted device 260 can also securely enforce various security control policies, such as locking of the user interface.

Figure 3:
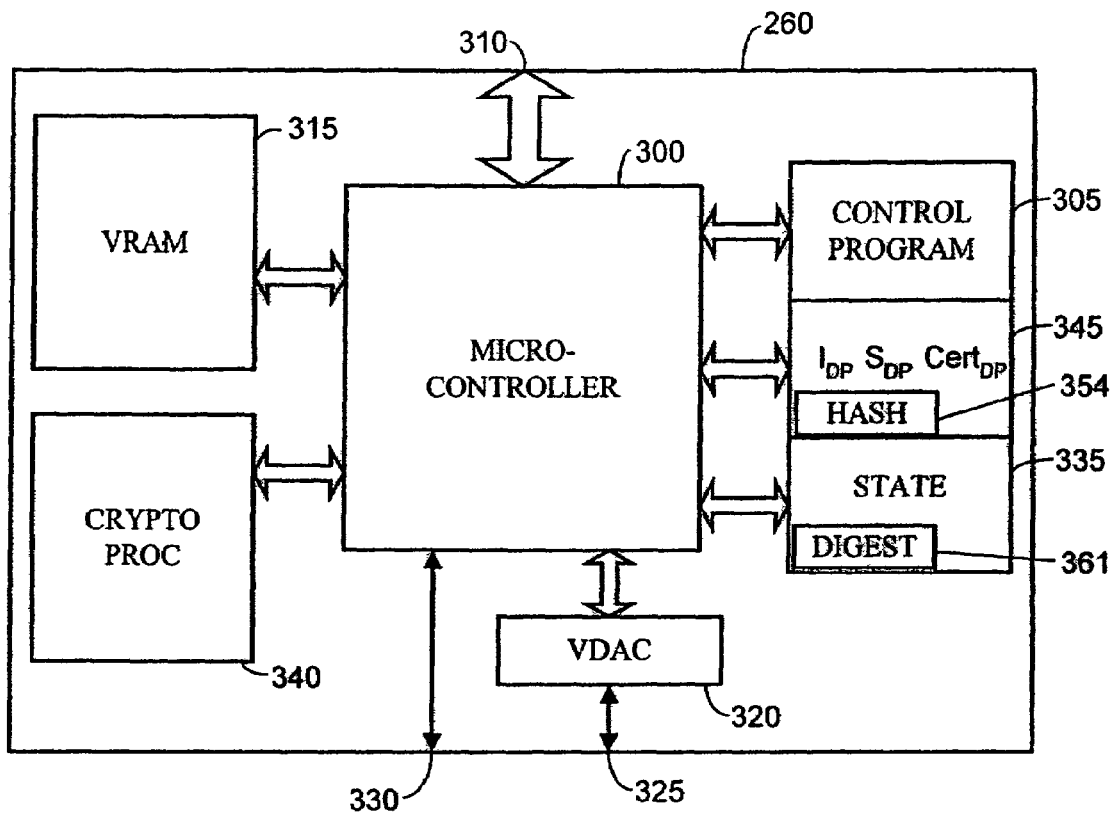
FIG. 3 is a diagram which illustrates a hardware architecture of a trusted device suitable for operating in accordance with the preferred embodiment of the present invention.

According to FIG. 3, the trusted device 260 comprises:

a microcontroller 300, programmed to control the overall operation of the trusted device 260 and to interact with the other elements of the trusted device 260 and other devices on the motherboard 215;

non-volatile memory 305, for example flash memory, containing respective control program instructions (i.e. firmware) for controlling the operation of the microcontroller 300 (alternatively, the trusted device 260 could be embodied in an ASIC, which would typically provide greater performance and cost efficiency in mass production, but would generally be more expensive to develop and less flexible)— functions contained in such control program instructions include a measurement function for acquiring an integrity metric for the platform 100 and an authentication function for authenticating smart card 122;

an interface 310 for connecting the trusted device 260 to the PCI bus for receiving image data (i.e. graphics primitives) from the CPU 200 and also authentication data such as trusted image data from the smartcard 122, as will be described;

frame buffer memory 315, which comprises sufficient VRAM (video RAM) in which to store at least one full image frame (a typical frame buffer memory 315 is 1–2 Mbytes in size, for screen resolutions of 1280×768 supporting up to 16.7 million colours);

a video DAC (digital to analogue converter) 320 for converting pixmap data into analogue signals for driving the (analogue) VDU 105, which connects to the video DAC 320 via a video interface 325;

an interface 330 for receiving signals directly from the trusted switch 135;

volatile memory 335, for example DRAM (dynamic RAM) or more expensive SRAM (static RAM), for storing state information, particularly received cryptographic keys, and for providing a work area for the microcontroller 300;

a cryptographic processor 340, comprising hardware cryptographic accelerators and/or software, arranged to provide the trusted device 260 with a cryptographic identity and to provide authenticity, integrity and confidentiality, guard against replay attacks, make digital signatures, and use digital certificates, as will be described in more detail below; and non-volatile memory 345, for example flash memory, for storing an identifier $I_{DP}$ of the trusted device 260 (for example a simple text string name), a private key $S_{DP}$ of the trusted device 260, a certificate $Cert_{DP}$ signed and provided by a trusted third party certification agency, such as VeriSign Inc., which binds the trusted device 260 with a signature public-private key pair and a confidentiality public-private key pair and includes the corresponding public keys of the trusted device 260.

A certificate typically contains such information, but not the public key of the CA. That public key is typically made available using a 'Public Key Infrastructure' (PKI). Operation of a PKI is well known to those skilled in the art of security.

The certificate $Cert_{DP}$ is used to supply the public key of the trusted device 260 to third parties in such a way that third parties are confident of the source of the public key and that the public key is a part of a valid public-private key pair. As such, it is unnecessary for a third party to have prior knowledge of, or to need to acquire, the public key of the trusted device 260.

The trusted device 260 lends its identity and trusted processes to the host computer and the trusted display processor has those properties by virtue of its tamper-resistance, resistance to forgery, and resistance to counterfeiting. Only selected entities with appropriate authentication mechanisms are able to influence the processes running inside the trusted device 260. Neither an ordinary user of the host computer, nor any ordinary user or any ordinary entity connected via a network to the host computer may access or interfere with the processes running inside the trusted device 260. The trusted device 260 has the property of being "inviolate".

The trusted device 260 is equipped with at least one method of reliably measuring or acquiring the integrity metric of the computing platform 100 with which it is associated. In the present embodiment, the integrity metric is acquired by the measurement function by generating a digest of the BIOS instructions in the BIOS memory. Such an acquired integrity metric, if verified as described above, gives a potential user of the platform 100 a high level of confidence that the platform 100 has not been subverted at a hardware, or BIOS program, level. Other known processes, for example virus checkers, will typically be in place to check that the operating system and application program code has not been subverted.

The measurement function has access to: non-volatile memory 345 for storing a hash program 354 and the private key $S_{DP}$ of the trusted device 260, and volatile memory 335 for storing acquired integrity metric in the form of a digest 361.

In one preferred implementation, as well as the digest, the integrity metric includes a Boolean value, which is stored in volatile memory 335 by the measurement function, for reasons that will become apparent.

Figure 15:
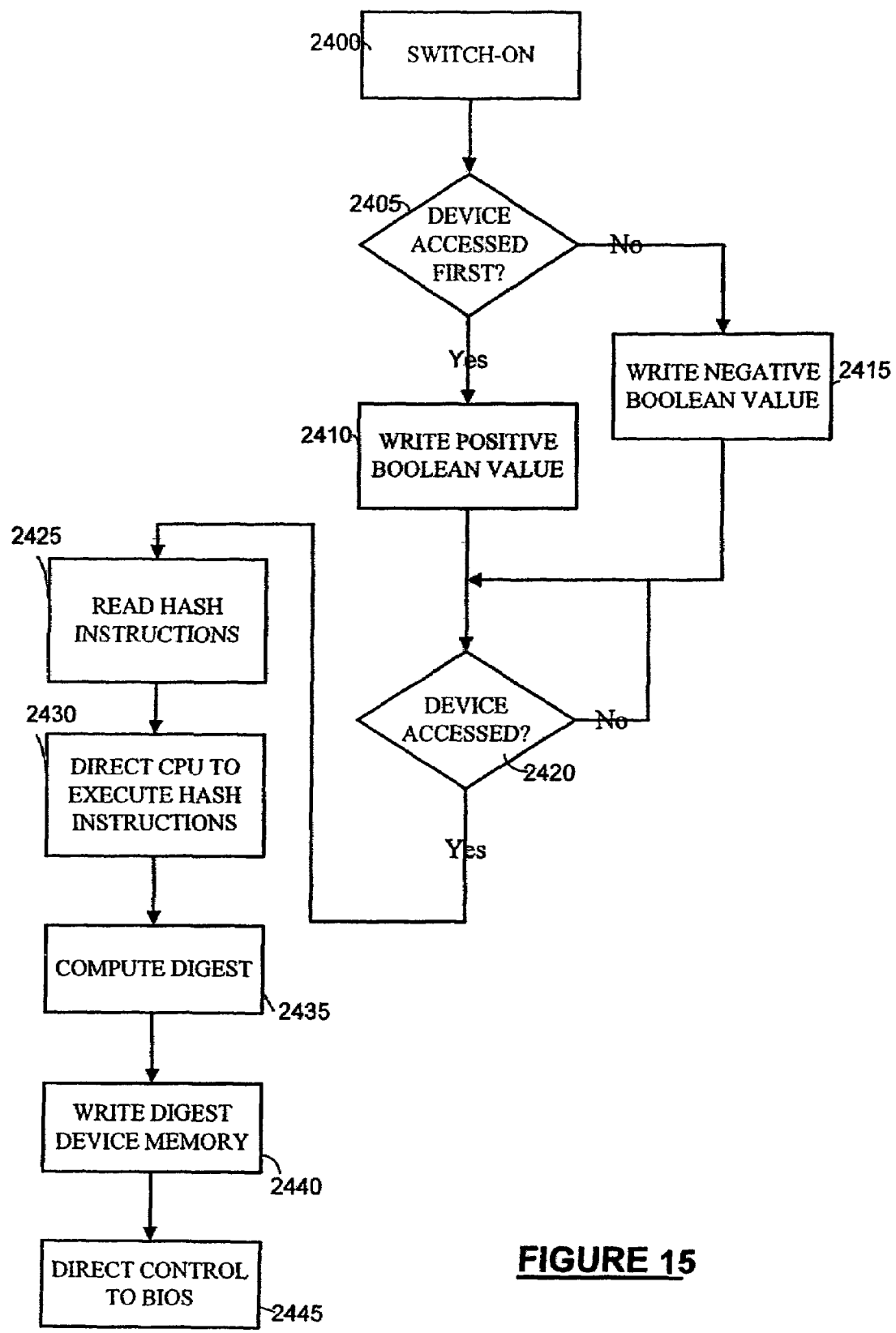
FIG. 15 is a flow diagram which illustrates the steps involved in acquiring an integrity metric of the computing apparatus.

A preferred process for acquiring an integrity metric will now be described with reference to FIG. 15.

In step 2400, at switch-on, the measurement function monitors the activity of the main processor 200 to determine whether the trusted device 260 is the first memory accessed. Under conventional operation, a main processor would first be directed to the BIOS memory first in order to execute the BIOS program. However, in accordance with the present embodiment, the main processor 200 is directed to the trusted device 260, which acts as a memory. In step 2405, if the trusted device 260 is the first memory accessed, in step 2410, the measurement function writes to volatile memory 335 a Boolean value which indicates that the trusted device 260 was the first memory accessed. Otherwise, in step 2415, the measurement function writes a Boolean value which indicates that the trusted device 260 was not the first memory accessed.

In the event the trusted device 260 is not the first accessed, there is of course a chance that the trusted device 260 will not be accessed at all. This would be the case, for example, if the main processor 200 were manipulated to run the BIOS program first. Under these circumstances, the platform would operate, but would be unable to verify its integrity on demand, since the integrity metric would not be available. Further, if the trusted device 260 were accessed after the BIOS program had been accessed, the Boolean value would clearly indicate lack of integrity of the platform.

In step 2420, when (or if) accessed as a memory by the main processor 200, the main processor 200 reads the stored native hash instructions 354 from the measurement function in step 2425. The hash instructions 354 are passed for processing by the main processor 200 over the data bus 225. In step 2430, main processor 200 executes the hash instructions 354 and uses them, in step 2435, to compute a digest of the BIOS memory 219, by reading the contents of the BIOS memory 219 and processing those contents according to the hash program. In step 2440, the main processor 200 writes the computed digest 361 to the appropriate non-volatile memory location 335 in the trusted device 260. The measurement function, in step 2445, then calls the BIOS program in the BIOS memory 219, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 260 is a separable component, some such form of interaction is desirable to provide an appropriate logical binding between the trusted device 260 and the platform. Also, although in the present embodiment the trusted device 260 utilises the data bus as its main means of communication with other parts of the platform, it would be feasible, although not so convenient, to provide alternative communications paths, such as hard-wired paths or optical paths. Further, although in the present embodiment the trusted device 260 instructs the main processor 200 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0— BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 260 may inspect the proper value of the BIOS digest in the certificate and not pass control to the BIOS if the computed digest does not match the proper value.

Additionally, or alternatively, the trusted device 260 may inspect the Boolean value and not pass control back to the BIOS if the trusted device 260 was not the first memory accessed. In either of these cases, an appropriate exception handling routine may be invoked.

Figure 16:
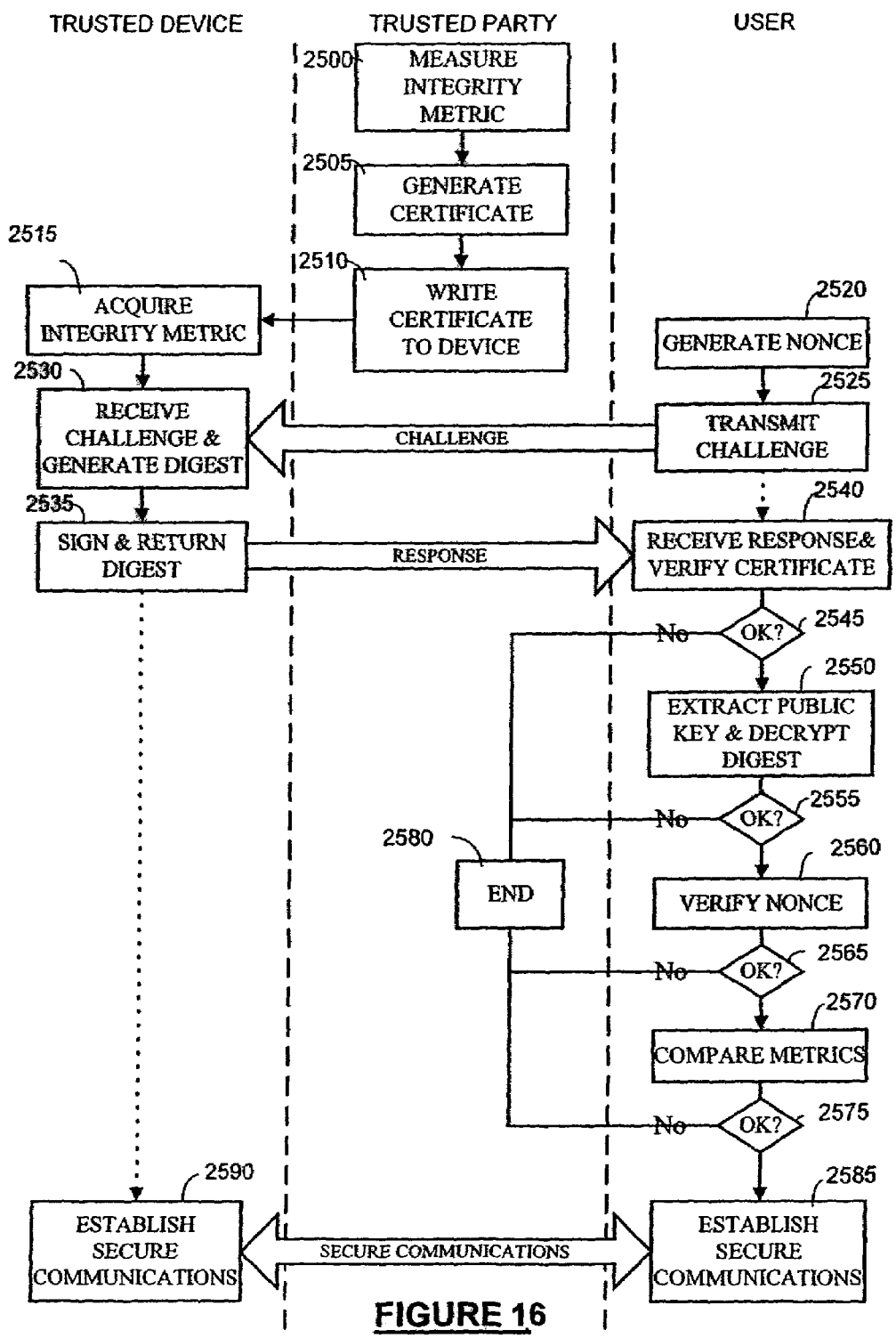
FIG. 16 is a flow diagram which illustrates the steps involved in establishing communications between a trusted computing platform and a remote platform including the trusted platform verifying its integrity.

FIG. 16 illustrates the flow of actions by a TP, the trusted device 260 incorporated into a platform, and a user (of a remote platform) who wants to verify the integrity of the trusted platform. It will be appreciated that substantially the same steps as are depicted in FIG. 16 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is preferred that, for a high level of integrity, the software application would reside on a smart card of the user, who would insert the smart card into an appropriate reader for the purposes of verification. The present preferred embodiments employ such an arrangement.

At the first instance, a TP, which vouches for trusted platforms, will inspect the type of the platform to decide whether to vouch for it or not. This will be a matter of policy. If all is well, in step 2500, the TP measures the value of integrity metric of the platform. Then, the TP generates a certificate, in step 2505, for the platform. The certificate is generated by the TP by appending the trusted device's public key, and optionally its ID label, to the measured integrity metric, and signing the string with the TP's private key.

The trusted device 260 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 2510, the trusted device 260 is initialised by writing the certificate $Cert_{DP}$ into the appropriate non-volatile memory locations of the trusted device 260. This is done, preferably, by secure communication with the trusted device 24 after it is installed in the motherboard 215. The method of writing the certificate to the trusted device 260 is analogous to the method used to initialise smart cards by writing private keys thereto. The secure communications is supported by a 'master key', known only to the TP, that is written to the trusted device (or smart card) during manufacture, and used to enable the writing of data to the trusted device 260; writing of data to the trusted device 260 without knowledge of the master key is not possible.

At some later point during operation of the platform, for example when it is switched on or reset, in step 2515, the trusted device 260 acquires and stores the integrity metric 361 of the platform.

When a user wishes to communicate with the platform, in step 2520, he creates a nonce, such as a random number, and, in step 2525, challenges the trusted device 260 (the operating system of the platform, or an appropriate software application, is arranged to recognise the challenge and pass it to the trusted device 260, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 2530, the trusted device 260 receives the challenge and creates an appropriate response. This may be a digest of the measured integrity metric and the nonce, and optionally its ID label. Then, in step 2535, the trusted device 260 signs the digest, using its private key, and returns the signed digest, accompanied by the certificate $Cert_{DP}$, to the user.

In step 2540, the user receives the challenge response and verifies the certificate using the well known public key of the TP. The user then, in step 2550, extracts the trusted device's 260 public key from the certificate and uses it to decrypt the signed digest from the challenge response. Then, in step 2560, the user verifies the nonce inside the challenge response. Next, in step 2570, the user compares the computed integrity metric, which it extracts from the challenge response, with the proper platform integrity metric, which it extracts from the certificate. If any of the foregoing verification steps fails, in steps 2545, 2555, 2565 or 2575, the whole process ends in step 2580 with no further communications taking place.

Assuming all is well, in steps 2585 and 2590, the user and the trusted platform use other protocols to set up secure communications for other data, where the data from the platform is preferably signed by the trusted device 260.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 260, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

The user's smart card 122 is a token device, separate from the computing entity, which interacts with the computing entity via the smart card reader port 120. A user may have several different smart cards issued by several different vendors or service providers, and may gain access to the internet or a plurality of network computers from any one of a plurality of computing entities as described herein, which are provided with a trusted component and smart card reader. A user's trust in the individual computing entity to which s/he is using is derived from the interaction between the user's trusted smart card token and the trusted component of the computing entity. The user relies on their trusted smart card token to verify the trustworthiness of the trusted component.

Figure 4:
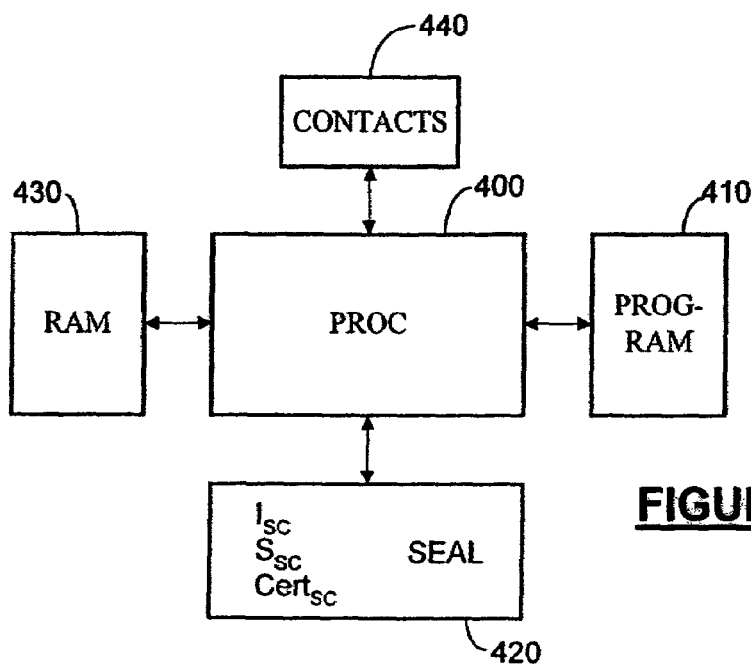
FIG. 4 is a diagram which illustrates a hardware architecture of a smart card processing engine suitable for operating in accordance with the preferred embodiment of the present invention.

The processing engine of a smartcard suitable for use in accordance with the preferred embodiment is illustrated in FIG. 4. The processing engine comprises a processor 400 for enacting standard encryption and decryption functions, and for simple challenge/response operations for authentication of the smart card 122 and verification of the platform 100, as will be discussed below. In the present embodiment, the processor 400 is an 8-bit microcontroller, which has a built-in operating system and is arranged to communicate with the outside world via asynchronous protocols specified through ISO 7816-3, 4, T=0, T=1 and T=14 standards. The smartcard also comprises non-volatile memory 420, for example flash memory, containing an identifier $I_{SC}$ of the smartcard 122, a private key $S_{SC}$, used for digitally signing data, and a certificate $Cert_{SC}$, provided by a trusted third party certification agency, which binds the smartcard with public-private key pairs and includes the corresponding public keys of the smartcard 122 (the same in nature to the certificate $Cert_{DP}$ of the trusted display processor 260). Further, the smartcard contains 'seal' data SEAL in the non-volatile memory 420, the significance of which will be discussed further below.

Figure 17:
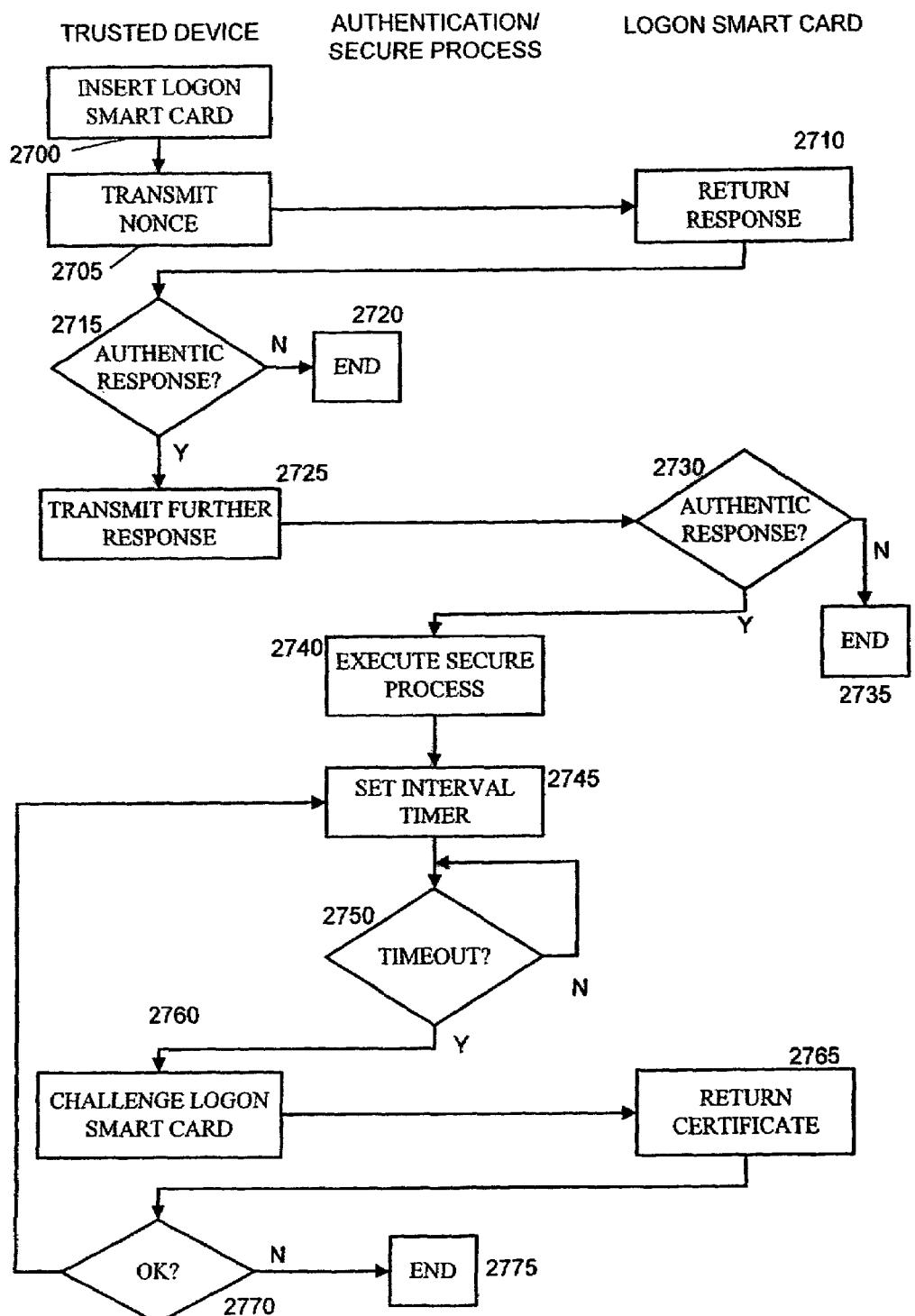
FIG. 17 is a flow diagram which illustrates the process of mutually authenticating a smart card and a host platform.

A preferred process for authentication between a user smart card 122 and a platform 100 will now be described with reference to the flow diagram in FIG. 17. As will be described, the process conveniently implements a challenge/response routine. There exist many available challenge/response mechanisms. The implementation of an authentication protocol used in the present embodiment is mutual (or 3-step) authentication, as described in ISO/IEC 9798-3. Of course, there is no reason why other authentication procedures cannot be used, for example 2-step or 4-step, as also described in ISO/IEC 9798-3.

Initially, the user inserts their user smart card 122 into the smart card reader 120 of the platform 100 in step 2700. Beforehand, the platform 100 will typically be operating under the control of its standard operating system and executing the authentication process, which waits for a user to insert their user smart card 122. Apart from the smart card reader 120 being active in this way, the platform 100 is typically rendered inaccessible to users by 'locking' the user interface (i.e. the screen, keyboard and mouse).

When the user smart card 122 is inserted into the smart card reader 120, the trusted device 260 is triggered to attempt mutual authentication in step by generating and transmitting a nonce A to the user smart card 122 in step 2705. A nonce, such as a random number, is used to protect the originator from deception caused by replay of old but genuine responses (called a 'replay attack') by untrustworthy third parties.

In response, in step 2710, the user smart card 122 generates and returns a response comprising the concatenation of: the plain text of the nonce A, a new nonce B generated by the user smart card 122, the ID of the trusted device 260 and some redundancy; the signature of the plain text, generated by signing the plain text with the private key of the user smart card 122; and a certificate containing the ID and the public key of the user smart card 122.

The trusted device 260 authenticates the response by using the public key in the certificate to verify the signature of the plain text in step 2715. If the response is not authentic, the process ends in step 2720. If the response is authentic, in step 2725 the trusted device 260 generates and sends a further response including the concatenation of: the plain text of the nonce A, the nonce B, the ID of the user smart card 122 and the acquired integrity metric; the signature of the plain text, generated by signing the plain text using the private key of the trusted device 260; and the certificate comprising the public key of the trusted device 260 and the authentic integrity metric, both signed by the private key of the TP.

The user smart card 122 authenticates this response by using the public key of the TP and comparing the acquired integrity metric with the authentic integrity metric, where a match indicates successful verification, in step 2730. If the further response is not authentic, the process ends in step 2735.

If the procedure is successful, both the trusted device 260 has authenticated the user smart card 122 and the user smart card 122 has verified the integrity of the trusted platform 100 and, in step 2740, the authentication process executes the secure process for the user. Then, the authentication process sets an interval timer in step 2745. Thereafter, using appropriate operating system interrupt routines, the authentication process services the interval timer periodically to detect when the timer meets or exceeds a pre-determined timeout period in step 2750.

Clearly, the authentication process and the interval timer run in parallel with the secure process.

When the timeout period is met or exceeded, the authentication process triggers the trusted device 260 to re-authenticate the user smart card 122, by transmitting a challenge for the user smart card 122 to identify itself in step 2760. The user smart card 122 returns a certificate including its ID and its public key in step 2765. In step 2770, if there is no response (for example, as a result of the user smart card 122 having been removed) or the certificate is no longer valid for some reason (for example, the user smart card has been replaced with a different smart card), the session is terminated by the trusted device 260 in step 2775. Otherwise, in step 2770, the process from step 2745 repeats by resetting the interval timer.

In this preferred implementation, the monitor 105 is driven directly by a monitor subsystem contained within the trusted component itself. In this embodiment, in the trusted component space are resident the trusted component itself, and displays generated by the trusted component on monitor 105. This arrangement is described further in the applicant's copending European Patent Application No. 99304164.9, entitled "System for Digitally Signing a Document" and filed on 28 May 1999 (and any patent applications claiming priority therefrom, including an International Patent Application of even date to the present application), which is incorporated by reference herein.

As will become apparent, use of this form of trusted device provides a secure user interface in particular by control of at least some of the display functionality of the host computer. More particularly, the trusted device (for these purposes termed a trusted display processor) or a device with similar properties is associated with video data at a stage in the video processing beyond the point where data can be manipulated by standard host computer software. This allows the trusted display processor to display data on a display surface without interference or subversion by the host computer software. Thus, the trusted display processor can be certain what image is currently being displayed to the user. This is used to unambiguously identify the image (pixmap) that a user is signing. A side-effect of this is that the trusted display processor may reliably display any of its data on the display surface, including, for example, the integrity metrics of the prior patent application, or user status messages or prompts.

The elements and functionality of a "trusted display" in which the trusted device is a trusted display processor will now be described further with reference to FIGS. 3 and 4.

It will be apparent from FIG. 3 that the frame buffer memory 315 is only accessible by the trusted display processor 260 itself, and not by the CPU 200. This is an important feature of the preferred embodiment, since it is imperative that the CPU 200, or, more importantly, subversive application programs or viruses, cannot modify the pixmap during a trusted operation. Of course, it would be feasible to provide the same level of security even if the CPU 200 could directly access the frame buffer memory 315, as long as the trusted display processor 260 were arranged to have ultimate control over when the CPU 200 could access the frame buffer memory 315. Obviously, this latter scheme would be more difficult to implement.

A typical process by which graphics primitives are generated by a host computer 100 will now be described by way of background. Initially, an application program, which wishes to display a particular image, makes an appropriate call, via a graphical API (application programming interface), to the operating system. An API typically provides a standard interface for an application program to access specific underlying display functions, such as provided by Windows NT™, for the purposes of displaying an image. The API call causes the operating system to make respective graphics driver library routine calls, which result in the generation of graphics primitives specific to a display processor, which in this case is the trusted display processor 260. These graphics primitives are finally passed by the CPU 200 to the trusted display processor 260. Example graphics primitives might be 'draw a line from point x to point y with thickness z' or 'fill an area bounded by points w, x, y and z with a colour a'.

The control program of the microcontroller 300 controls the microcontroller to provide the standard display functions to process the received graphics primitives, specifically:

receiving from the CPU 200 and processing graphics primitives to form pixmap data which is directly representative of an image to be displayed on the VDU 105 screen, where the pixmap data generally includes intensity values for each of the red, green and blue dots of each addressable pixel on the VDU 105 screen;

storing the pixmap data into the frame buffer memory 315; and periodically, for example sixty times a second, reading the pixmap data from the frame buffer memory 315, converting the data into analogue signals using the video DAC and transmitting the analogue signals to the VDU 105 to display the required image on the screen.

Apart from the standard display functions, the control program includes a function to mix display image data deceived from the CPU 200 with trusted image data to form a single pixmap. The control program also manages interaction with the cryptographic processor and the trusted switch 135.

The trusted display processor 260 forms a part of the overall 'display system' of the host computer 100; the other parts typically being display functions of the operating system, which can be 'called' by application programs and which access the standard display functions of the graphics processor, and the VDU 105. In other words, the 'display system' of a host computer 100 comprises every piece of hardware or functionality which is concerned with displaying an image.

As already mentioned, the trusted display of this embodiment relies on interaction between the trusted display processor and the user smartcard 122. Particularly significant is the 'seal' data SEAL in the non-volatile memory 420, which can be represented graphically by the trusted display processor 260 to indicate to the user that a process is operating securely with the user's smartcard, as will be described in detail below. In the present embodiment, the seal data SEAL is in the form of an image pixmap, which was originally selected by the user as a unique identifier, for example an image of the user himself, and loaded into the smartcard 122 using well-known techniques. The processor 400 also has access to volatile memory 430, for example RAM, for storing state information (such as received keys) and providing a working area for the processor 400, and an interface 440, for example electrical contacts, for communicating with a smart card reader.

Seal images can consume relatively large amounts of memory if stored as pixmaps. This may be a distinct disadvantage in circumstances where the image needs to be stored on a smartcard 122, where memory capacity is relatively limited. The memory requirement may be reduced by a number of different techniques. For example, the seal image could comprise: a compressed image, which can be decompressed by the trusted display processor 260; a thumb-nail image that forms the primitive element of a repeating mosaic generated by the trusted display processor 260; a naturally compressed image, such as a set of alphanumeric characters, which can be displayed by the trusted display processor 260 as a single large image, or used as a thumb-nail image as above. In any of these alternatives, the seal data itself may be in encrypted form and require the trusted display processor 260 to decrypt the data before it can be displayed. Alternatively, the seal data may be an encrypted index, which identifies one of a number of possible images stored by the host computer 100 or a network server. In this case, the index would be fetched by the trusted display processor 260 across a secure channel and decrypted in order to retrieve and display the correct image. Further, the seal data could comprise instructions (for example PostScript™ instructions) that could be interpreted by an appropriately programmed trusted display processor 260 to generate an image.

Figure 18:
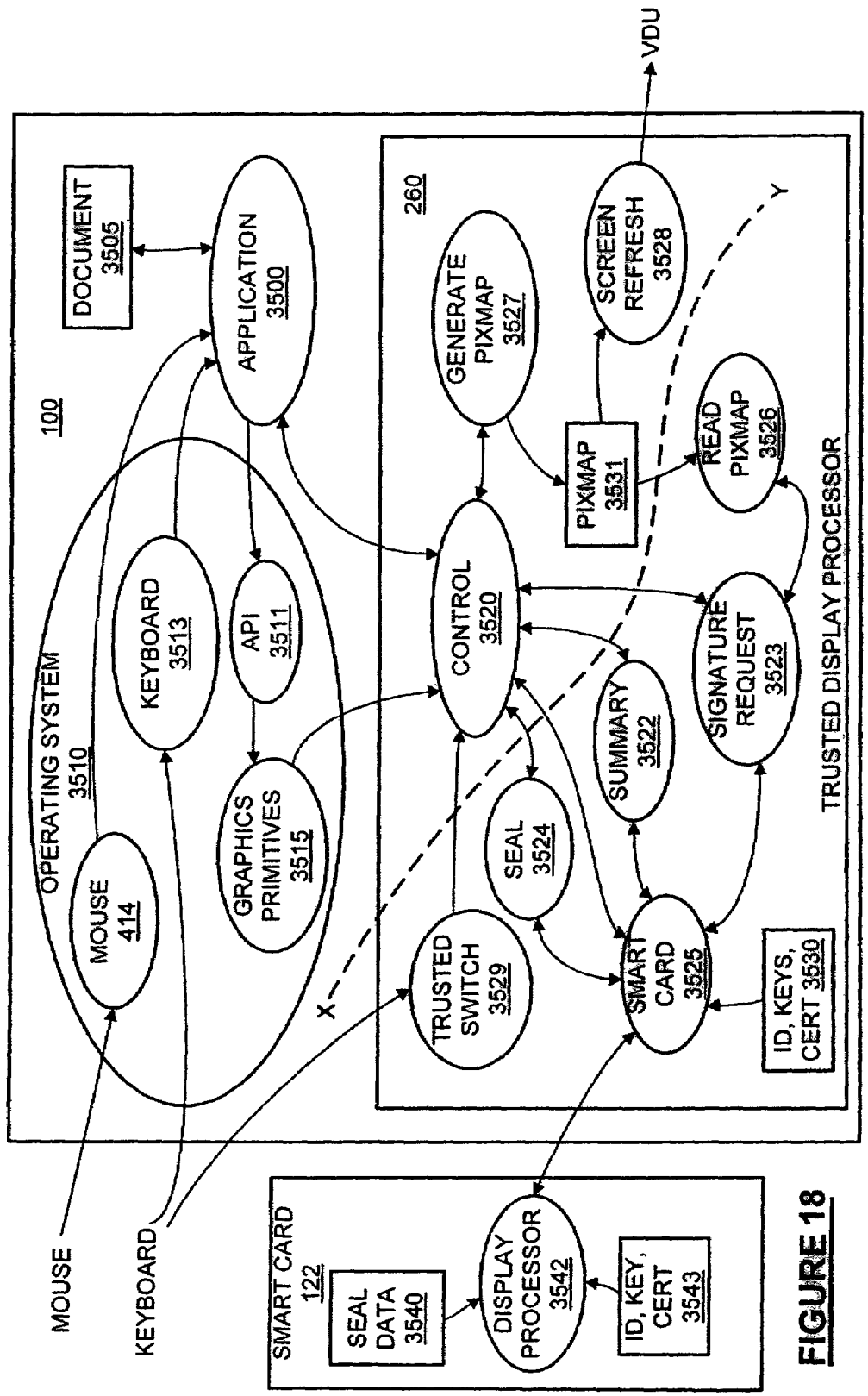
FIG. 18 is a diagram which illustrates a functional architecture of a computer platform including a trusted device adapted to act as a trusted display processor and a smart card suitable for operating in accordance with the preferred embodiment of the present invention.

FIG. 18 shows the logical relationship between the functions of the host computer 100, the trusted display processor 260 and the smartcard 122, in the context of enacting a trusted signing operation. Apart from logical separation into host computer 100, trusted display processor 260 or smartcard 122 functions, the functions are represented independently of the physical architecture, in order to provide a clear representation of the processes which take part in a trusted signing operation. In addition, the 'standard display functions' are partitioned from the trusted functions by a line x-y, where functions to the left of the line are specifically trusted functions. In the diagram, functions are represented in ovals, and the 'permanent' data (including the document image for the duration of the signing process), on which the functions act, are shown in boxes. Dynamic data, such as state data or received cryptographic keys are not illustrated, purely for reasons of clarity. Arrows between ovals and between ovals and boxes represent respective logical communications paths.

In accordance with FIG. 18, the host computer 100 includes: an application process 3500, for example a word-processor process, which requests the signing of a document; document data 3505; an operating system process 3510; an API 3511 process for receiving display calls from the application process 3500; a keyboard process 3513 for providing input from the keyboard 110 to the application process 3500; a mouse process 3514 for providing input from the mouse 115 to the application process 3500; and a graphics primitives process 3515 for generating graphics primitives on the basis of calls received from the application process via the API 3511 process. The API process 3511, the keyboard process 3513, the mouse process 3514 and the graphics primitives process 3515 are build on top of the operating system process 3510 and communicate with the application process via the operating system process 3510.

The remaining functions of the host computer 100 are those provided by the trusted display processor 260. These functions are: a control process 3520 for coordinating all the operations of the trusted display processor 260, and for receiving graphics primitives from the graphics primitives process and signature requests from the application process 3500; a summary process 3522 for generating a signed summary representative of a document signing procedure in response to a request from the control process 3520; a signature request process 3523 for acquiring a digital signature of the pixmap from the smartcard 122; a seal process 3524 for retrieving seal data 3540 from the smartcard 122; a smartcard process 525 for interacting with the smartcard 122 in order to enact challenge/response and data signing tasks required by the summary process 3522, the signature request process 3523 and the seal process 3524; a read pixmap process 3526 for reading stored pixmap data 3531 and passing it to the signature request process 3523 when requested to do so by the signature request process 3523; a generate pixmap process 3527 for generating the pixmap data 3531 on the basis of graphics primitives and seal image data received from the control process 3520; a screen refresh process 3528 for reading the pixmap data, converting it into analogue signals and transmitting the signals to the VDU 105; and a trusted switch process 3529 for monitoring whether the trusted switch 135 has been activated by the user. The smartcard process 3525 has access to the trusted display processor's identity data $I_{DP}$, private key $S_{DP}$ data and certificate $Cert_{DP}$ data 3530. In practice, the smart card and the trusted display processor interact with one another via standard operating system calls.

The smartcard 122 has: seal data 3540; a display processor process 3542 for interacting with the trusted display processor 260 to enact challenge/response and data signing tasks; smartcard identity data $I_{SC}$, smartcard private key data $S_{SC}$ and smartcard certificate data $Cert_{SC}$ 3543.

In other embodiments of the invention, the functionality of trusted switch 135 may be replaced by software. When the trusted switch process 529 is activated (as in step 630), instead of waiting for operation of a dedicated switch, the trusted component 260 uses its random number generation capability to generate a nonce in the form of a textual string. This textual string is then displayed on the trusted display in a message of the form "Please enter <textual string> to confirm the action>. To confirm the action, the user must then enter the given textual string, using the keyboard 110. As the textual string will be different every time, and because no other software has access to this textual string (it passes only between the trusted processor 300 and the display), it will not be possible for malicious software to subvert this confirmation process.

On each individual smart card may be stored a corresponding respective image data which is different for each smart card. For user interactions with the trusted component, e.g. for a dialogue box monitor display generated by the trusted component, the trusted component takes the image data 1001 from the user's smart card, and uses this as a background to the dialogue box displayed on the monitor 105. Thus, the user has confidence that the dialogue box displayed on the monitor 105 is generated by the trusted component. The image data is preferably easily recognizable by a human being in a manner such that any forgeries would be immediately apparent visually to a user. For example, the image data may comprise a photograph of a user. The image data on the smart card may be unique to a person using the smart card.

In a preferred implementation of the present invention, a user may specify a selected logical or physical entity on the computer platform, for example a file, application, driver, port, interface or the like for monitoring of events which occur on that entity. Two types of monitoring may be provided, firstly continuous monitoring over a predetermined period, which is set by a user through the trusted component, and secondly, monitoring for specific events which occur on an entity. In particular, a user may specify a particular file of high value, or of restricted information content and apply monitoring of that specified file so that any interactions involving that file, whether authorized or not, are automatically logged and stored in a manner in which the events occurring on the file cannot be deleted, erased or corrupted, without this being immediately apparent.

Figure 5:
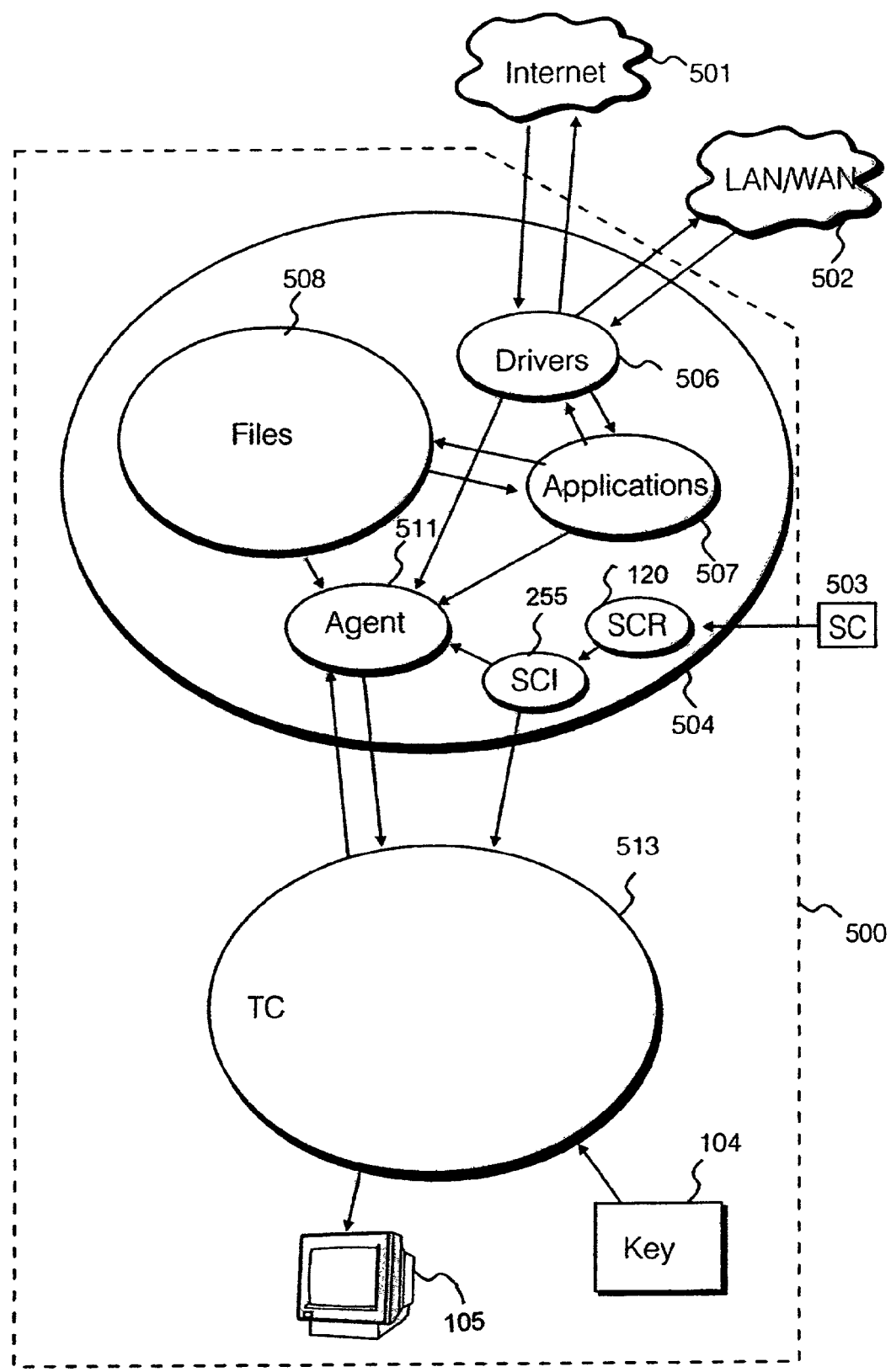
FIG. 5 illustrates schematically a logical architecture of the computer entity, divided into a monitored user space, resident on the computer platform and a trusted space resident on the trusted component.

Referring to FIG. 5 herein, there is illustrated schematically a logical architecture of the computer entity 500. The logical architecture has a same basic division between the computer platform, and the trusted component, as is present with the physical architecture described in FIGS. 1 to 4 herein. That is to say, the trusted component is logically distinct from the computer platform to which it is physically related. The computer entity comprises a user space 504 being a logical space which is physically resident on the computer platform (the first processor and first data storage means) and a trusted component space 513 being a logical space which is physically resident on the trusted component 260. In the user space 504 are one or a plurality of drivers 506, one or a plurality of applications programs 507, a file storage area 508; smart card reader 120; smart card interface 255; and a software agent 511 which operates to perform operations in the user space and report back to trusted component 260. The trusted component space is a logical area based upon and physically resident in the trusted component, supported by the second data processor and second memory area of the trusted component. Confirmation key device 135 inputs directly to the trusted component space 513, and monitor 105 receives images directly from the trusted component space 513. External to the computer entity are external communications networks eg the Internet 501, and various local area networks, wide area networks 502 which are connected to the user space via the drivers 506 which may include one or more modem ports. External user smart card 503 inputs into smart card reader 120 in the user space.

In the trusted component space, are resident the trusted component itself, displays generated by the trusted component on monitor 105; and confirmation key 135, inputting a confirmation signal via a confirmation key interface.

Figure 6:
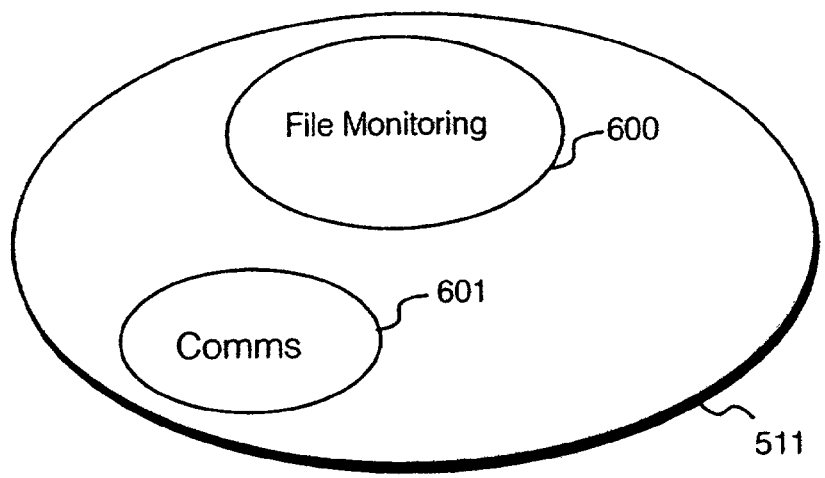
FIG. 6 illustrates schematically components of a monitoring agent which monitors events occurring on the computer platform and reports back to the trusted component.

Referring to FIG. 6 herein, within agent 511, there is provided a communications component 601 for communicating with the trusted component 260; and a file monitoring component 600 the purpose of which is to monitor events occurring on specified logical or physical entities, eg data files, applications or drivers on the computer platform, within the user space.

Figure 7:
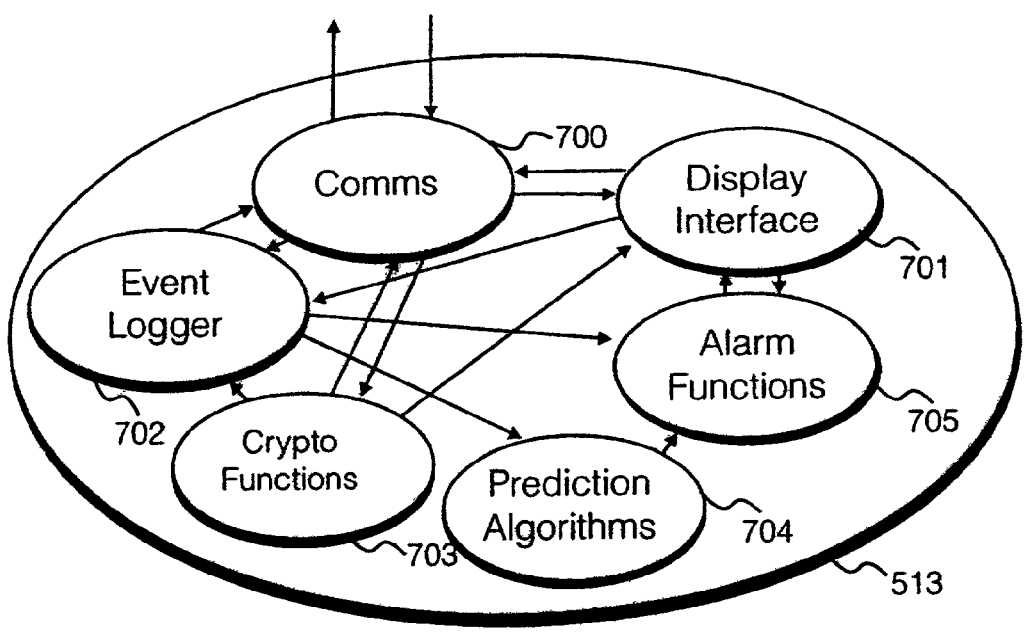
FIG. 7 illustrates schematically logical components of the trusted component itself.

Referring to FIG. 7 herein, there is illustrated schematically internal components on the trusted component 260 resident in trusted space 513. The trusted component comprises a communications component 700 for communicating with software agent 511 in user space; a display interface component 701 which includes a display generator for generating a plurality of interface displays which are displayed on monitor 100 and interface code enabling a user of the computing entity to interact with trusted component 202; an event logger program 702 for selecting an individual file, application, driver or the like on the computer platform, and monitor the file, application or driver and compile a log of events which occur on the file, application or driver; a plurality of cryptographic functions 703 which are used to cryptographically link the event log produced by event logger component 702 in a manner from which it is immediately apparent if the event log has been tampered with after leaving event logger 702; a set of prediction algorithms 704 for producing prediction data predicting the operation and performance of various parameters which may be selected by a user for monitoring by the trusted component; and an alarm generation component 705 for generating an alarm when monitored event parameters fall outside pre-determined ranges set by a user, or fall outside ranges predicted by prediction algorithms 704.

Operation of the computer entity, and in particular operation of trusted component 260 and its interactivity with agent 511 for monitoring of events on the computer platform will now be described.

Figure 8:
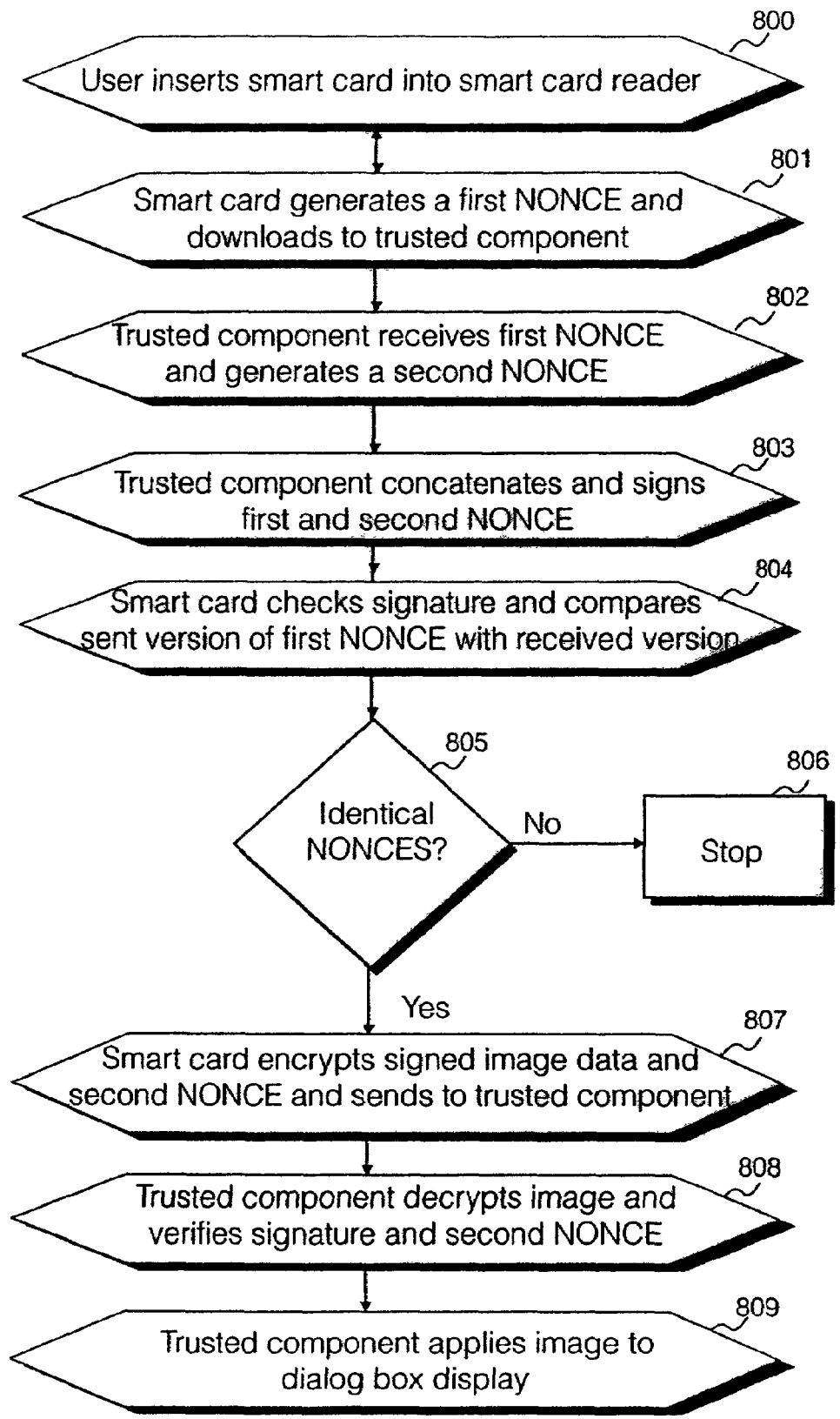
FIG. 8 illustrates schematically process steps carried out for establishing a secure communication between the user and the trusted component by way of a display on a monitor device.

Referring to FIG. 8 herein, there is illustrated schematically a set of process steps carried out by the computer entity for generating a dialogue display on monitor 105 and for establishing to a user of the monitor that the trusted component within the computer entity is present and functioning. Firstly, in step 800, a user of the computer entity enters his or her smart card 122 into smart card reader port 120. A pre-stored algorithm on the smart card generates a nonce R1, and downloads the nonce R1 to the trusted component through the smart card reader 120, smart card interface 255 and via data bus 225 to the trusted component 260. The nonce R1 typically comprises a random burst of bits generated by the smart card 122. Smart card 122 stores the nonce R1 temporarily on an internal memory of the smart card in order to compare the stored nonce R1 with a response message to be received from the trusted component. In step 802, the trusted component receives the nonce R1, generates a second nonce R2, concatenates R1 with R2, and proceeds to sign the concatenation R1||R2 using cryptographic functions 703. The process of applying a digital signature in order to authenticate digital data is well known in the art and is described in "Handbook of Applied Cryptography", Menezes Vanoorschot, Vanstone, in sections 1.6 and 1.83. Additionally, an introduction to the use of digital signatures can be found in "Applied Cryptography—Second edition", Schneier, in section 2.6. Trusted component 260 then resends the signed nonces back to the smart card in step 803. The smart card checks the signature on the received message returned from the trusted component in step 804 and compares the nonce contained in the received message with the originally sent nonce R1, a copy of which has been stored in its internal memory. If the nonce returned from the trusted component is different to that from the stored nonce then in step 805 the smart card stops operation in step 806. Difference in nonce's indicates that the trusted component is either not working properly, or there has been some tampering with the nonce data between the smart card reader 120 and trusted component 260 resulting in changes to the nonce data. At this point, smart card 122 does not "trust" the computer entity as a whole because its generated nonce has not been correctly returned by the computer entity.

If the nonce returned from the trusted component is identical to that as originally sent by the smart card and the comparison of the two R1 nonce's in 805 is successful, in step 807, the smart card then proceeds to retrieve a stored image data from its internal memory, append the nonce R2, sign the concatenation, encrypt the stored image data and send the encrypted image data and the signature to the trusted component via smart card reader 120. The trusted component receives the encrypted image and signature data via smart card reader interface 305, and data bus 304 and in step 808 decrypts the image data and verifies the signature using its cryptographic functions 703, and verifies the nonce R2. The image data is stored internally in the memory area of the trusted component. The trusted component then uses the image data as a background for any visual displays it generates on monitor 105 created by trusted component 260 for interaction with the human user in step 809.

Figure 9:
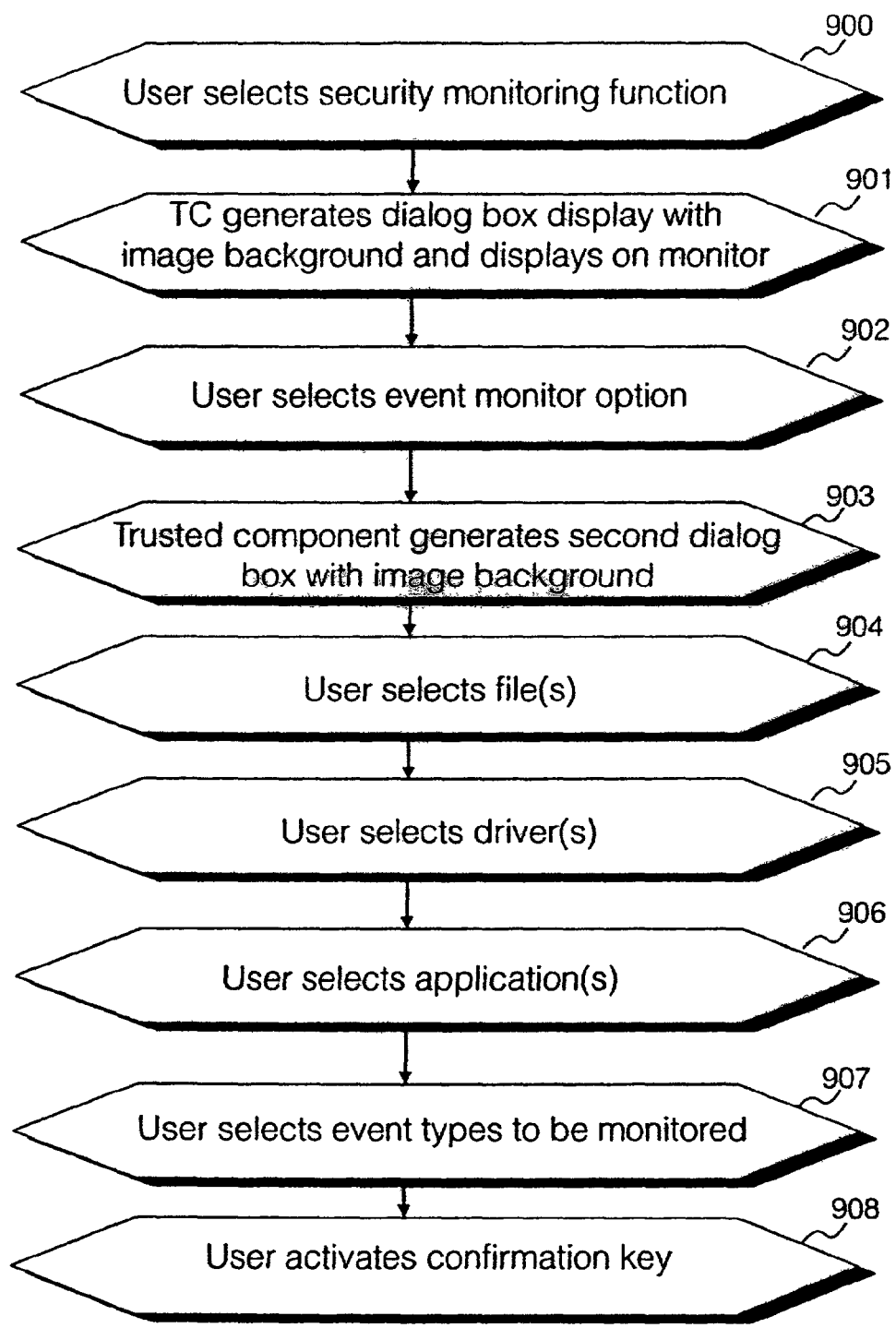
FIG. 9 illustrates schematically process steps for selecting security monitoring functions using a display monitor.
Figure 10:
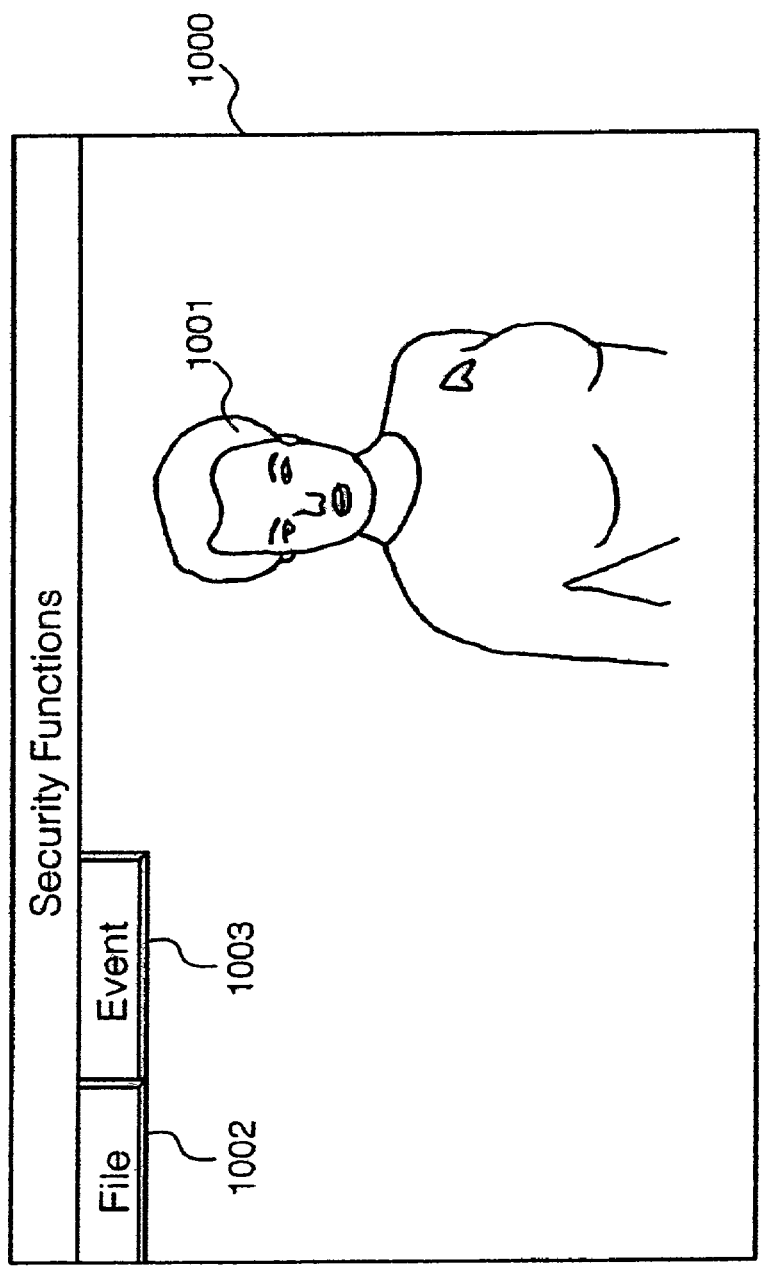
FIG. 10 illustrates schematically a first dialogue box display generated by the trusted component.
Figure 11:
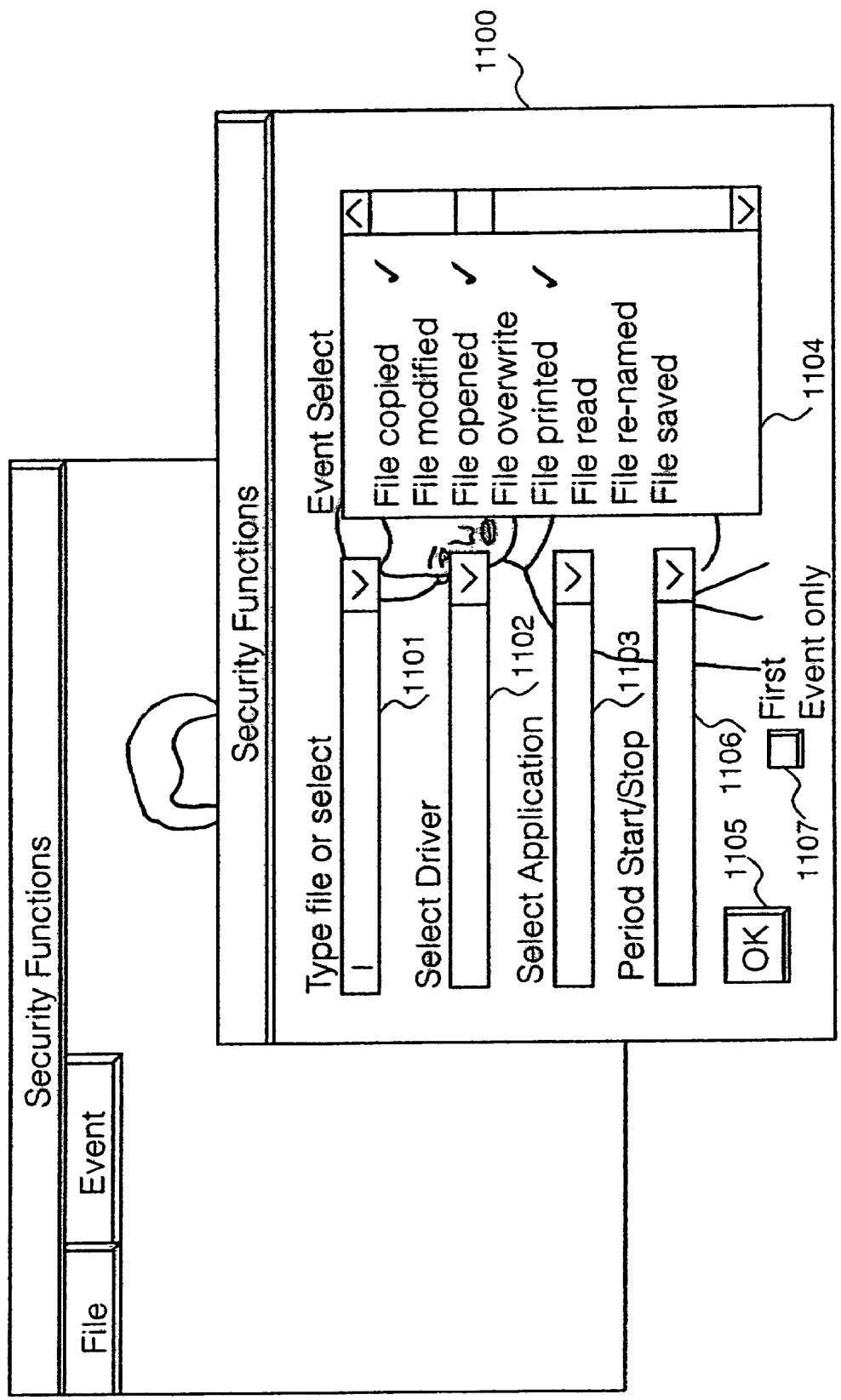
FIG. 11 illustrates schematically a second dialogue box display used for entering data by a user.

Referring to FIGS. 9 to 11 herein, there will now be described a set of process steps carried out by the computer entity for selecting items to be monitored on the computer platform, and for activating a monitoring session. In step 900, a user selects the security monitoring function by clicking pointing device 115 on an icon presented on a normal operating system view on monitor 105. The icon is generated by a display generator component of display interface 701 of the trusted component 260. Clicking the icon causes the trusted component to generate a dialogue box display on the monitor 105, for example as illustrated in FIG. 10 herein. The dialogue box display on monitor 105 is generated directly by display interface component 701 in a secure memory area of trusted component 260. Display of the image 1001 downloaded from the user's smart card 503 gives a visual confirmation to a user that the dialogue box is generated by the trusted component, since the trusted component is the only element of the computer entity which has access to the image data stored on the smart card. On the security monitoring dialogue box, there is an icon for "file" 1002 which is activated in a file monitoring mode of operation (not described herein) of the computer entity, and an "event" icon 1003 for event monitoring operation. A user selects an event monitoring menu 1100 by clicking the "event" icon 1003 by operating the pointing device 115 on the event icon 1003, in step 902. On activation of the "event" icon, the trusted component generates a second dialogue box comprising an event monitoring menu 1100 which also has the users preloaded image displayed as a backdrop to the event monitor menu 1100 as previously. The event monitor menu comprises a dialogue box having data entry areas 1101–1103, each having a drop down menu, for selecting items on the computer platform such as a user file, a driver, or an application. In general, any physical or logical component of the computer platform which gives rise to event data when events occur on that component can be selected by the trusted component. For ease of description, in the following, selections will be described primarily in relation to data files, application programs and drivers, although it will be appreciated that the general methods and principles described herein are applicable to the general set of components and facilities of the computer platform. By activating the drop down menu on each of selection boxes 1101–1103, there is listed a corresponding respective list of data files, drivers, or applications which are present on the computer platform. A user may select any of these files and/or applications and/or drivers by activating the pointing device on the selected icon from the drop down menu in conventional manner in steps 904, 905, 906. Additionally, the event monitor menu comprises an event select menu 1104. The event select menu lists a plurality of event types which can be monitored by the event logger 702 within the trusted component, for the file, application or driver which is selected in selection boxes 1101, 1102, 1103 respectively.

Types of event which can be monitored include events in the set: file copied—the event of a selected file being copied by an application or user; file saved—the event of whether a specified file is saved by an application or user; file renamed—the event of whether a file has been renamed by an application or user; file opened—the event of whether a file is opened by an application or user; file overwritten—the event of whether data within a file has been overwritten; file read—the event of whether data in a file has been read by any user, application or other entity; file modified—the event of whether data in a file has been modified by a user, application or other entity; file printed—the event of whether a file has been sent to a print port of the computer entity; driver used—whether a particular driver has been used by any application or file; driver reconfigured—the event of whether a driver has been reconfigured; modem used—subset of the driver used event, applying to whether a modem has been used or not; disk drive used—the event of whether a disk drive has been used in any way, either written or read; application opened—the event of whether an application has been opened; and application closed—the event of whether an application has been closed. Once the user has selected the application, driver or file and the events to be monitored in dialog box 1100, the user activates the confirmation key 135, which is confirmed by confirmation key icon 1105 visually altering, in order to activate a monitoring session. A monitoring session can only be activated by use of the dialog box 1100, having the user's image 1001 from the user's smart card display thereon, and by independently pressing confirmation key 135. Display of the image 1001 on the monitor 100, enables the user to have confidence that the trusted component is generating the dialog box. Pressing the confirmation key 135 by the user, which is directly input into trusted component 202 independently of the computer platform gives direct confirmation to the trusted component that the user, and not some other entity, e.g. a virus or the like is activating the monitoring session.

The user may also specify a monitoring period by entering a start time and date and a stop time and date in data entry window 1106. Alternatively, where a single event on a specified entity is to be monitored, the user can specify monitoring of that event only by confirming with pointing device 115 in first event only selection box 1107.

Two modes of operation will now be described, in the first mode of operation, continuous event monitoring of specified entities over a user specified period occurs. In the second mode of operation, continuous monitoring of a specified entity occurs until a user specified event has happened, or until a user specified period for monitoring that user specified event has elapsed.

Figure 12:
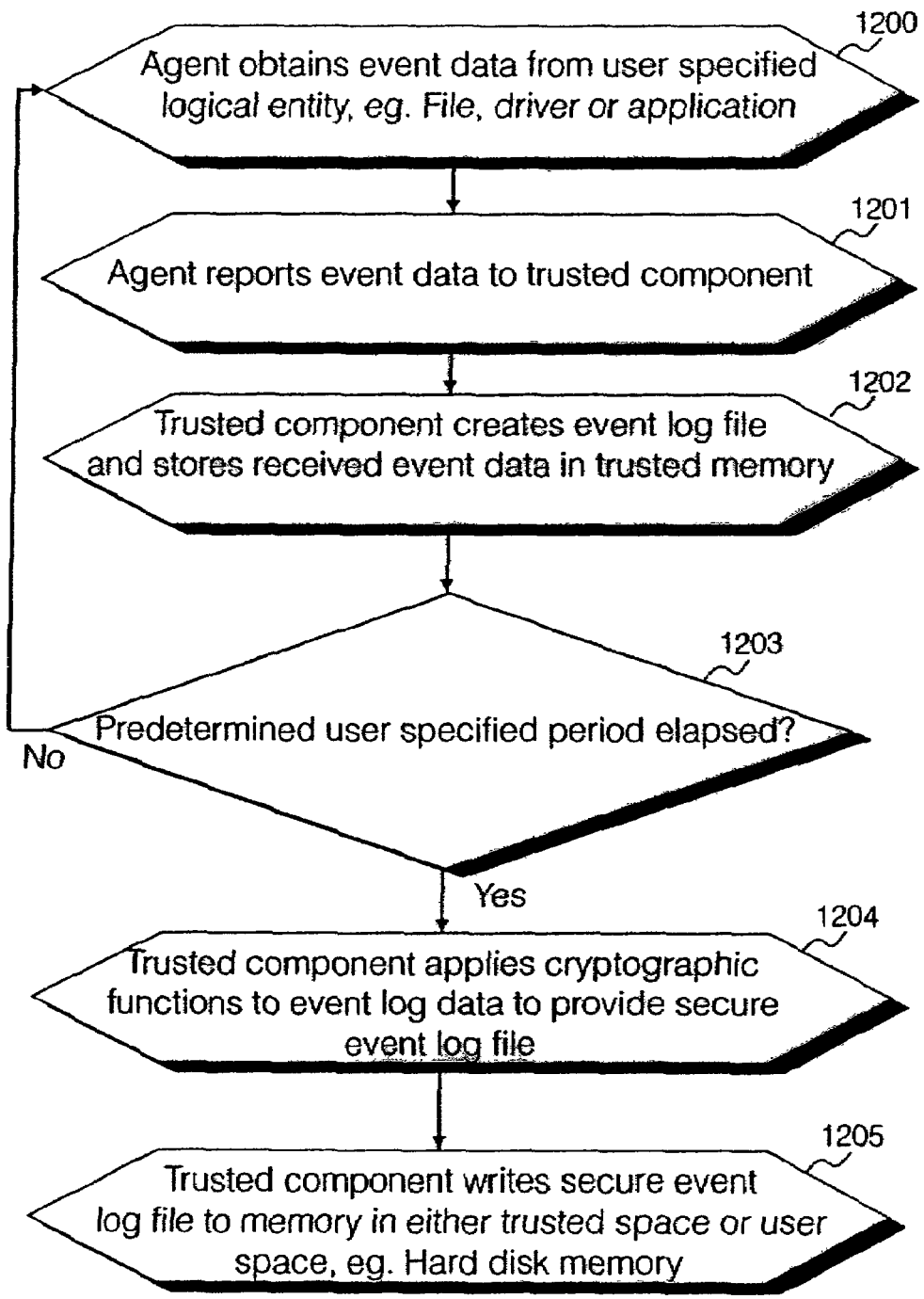
FIG. 12 illustrates schematically operations carried out by the monitoring agent and the trusted component for monitoring logical and/or physical entities such as files, applications or drivers on the computer platform.

In FIG. 12 herein, there is illustrated a procedure for continuous monitoring of a specified logical or physical entity over a user specified monitoring period.

Referring to FIG. 12 herein, there is illustrated schematically process steps operated by trusted component 260 in response to a user input to start an event monitoring session as described with reference to FIGS. 8 to 11 herein before. In step 1200, display interface 701 receives commands from the user via the dialogue boxes which are input using pointing device 115, keyboard 110 via data bus 225 and via communications interface 700 of the trusted component. The event logger 702 instructs agent 511 in user space to commence event monitoring. The instructions comprising event logger 702 are stored within a memory area resident within the trusted component 260. Additionally, event logger 702 is also executed within a memory area in the trusted component. In contrast, whilst the instructions comprising agent 511 are stored inside the trusted component 260 in a form suitable for execution on the host processor ie in CPU native programs area 403 of the trust component, agent 511 is executed within untrusted user space ie outside of the trusted component 260. Agent 511 receives details of the file, application and/or drivers to be monitored from event logger 702. In step 1200, agent 511 receives a series of event data from the logical entity (eg file, application or driver) specified. Such monitoring is a continuous process, and agent 511 may perform step 1200 by periodically reading a data file in which such event data is automatically stored by the operating system (for example in the Microsoft windows 4.O ™ operating system which contains the facility for logging events on a file). However, in order to maximize security, it is preferable the agent 511 periodically gathers event data itself by interrogating the file, application or driver directly to elicit a response. In step 1201, the collected data concerning the events of entity are reported directly to the trusted component 260, which then stores them in a trusted memory area in step 1202. In step 1203, the event logger checks whether the user specified predetermined monitoring period from the start of the event monitoring session has elapsed. If the event monitoring session period has not yet elapsed, event logger 702 continues to await further events on the specified files, applications or drivers supported by the agent 511, which steps through steps 1200–1202 as previously until the predetermined user specified period has elapsed in step 1203. In step 1204, the trusted component takes the content of the event data stored in trusted memory and applies cryptographic function 703 to the event log to provide a secure event log file. The process of securing the event log file as described herein before is such that the secured file has at least the properties of:

Authentication—an authorised user or program should be able to correctly ascertain the origin of the event log file;

Integrity—It should be possible to verify that the event log file has not been modified by an unauthorised individual or program.

Optionally, the secured file should have the property of confidentiality—unauthorised users or programs should not be able to access the information contained within the event log file; and the property of non-repudiation—proper authentication of data cannot later be falsely denied.

The trusted component in step 1205 writes the secure event log file to a memory device. The memory device may either be in trusted space, or in user space. For example the secure event log file may be stored in a user accessible portion of a hard disk drive 240.

By providing a secure event log file containing data describing a plurality of events which have occurred on a specified file, application or driver, a user reading the file can be confident that the data in the file has been written by the trusted component and has not been corrupted. Any corruption to the data are immediately evident. In the best mode herein, securing of the event log file is made by applying a chaining algorithm which chains arbitrary chunks of data as is known in the art. In such chaining processes, the output of a previous encryption process is used to initialize a next encryption process. The amounts of data in each encrypted data block are of arbitrary length, rather than being a single plain text block. Details of such chaining algorithms which are known in the art can be found in "Handbook of Applied Cryptography", Menezes Vanoorschot, Vanstone, on page 229. The key used during the chaining process is one stored within the trusted component 260, preferably the private signature key of the trusted component. The validity of the secured event log can then readily be confirmed by any entity possessing the public signature key of the trusted component. Such methods are well known to those skilled in the art of information security.

Event data is preferably gathered by the use of additional device drivers. NT is designed so that additional device drivers may be inserted between existing device drivers. It is therefore possible to design and insert drivers that trap access to files, applications, and other device drivers, and provide details of the interactions as event data. Information on the design and use of device drivers may be found, for example, in the 'The Windows NT Device Driver Book' (author A.Baker, published by Prentice Hall). Also, commercial companies such as 'BlueWater Systems' offer device driver toolkits.

Figure 13:
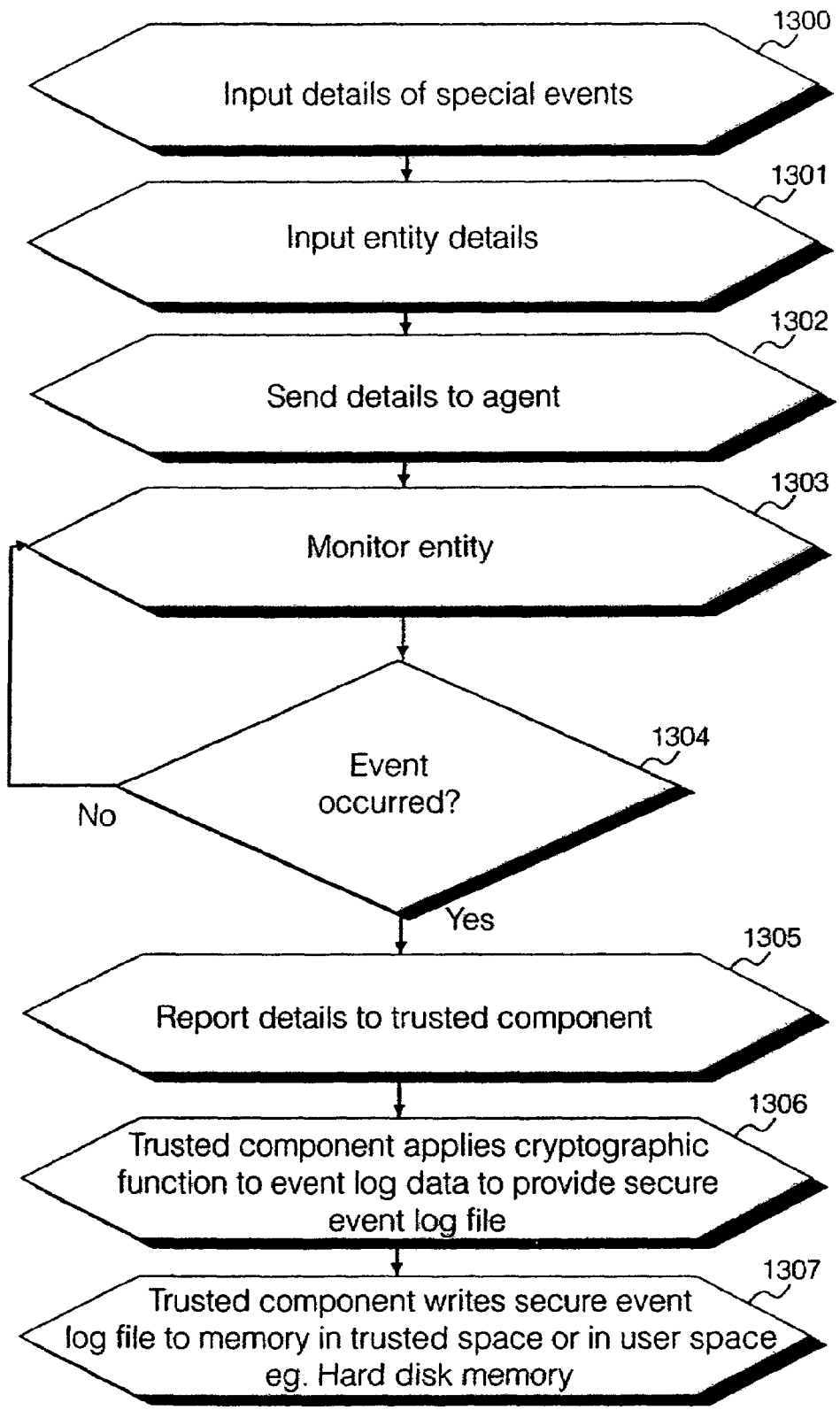
FIG. 13 illustrates schematically process steps operated by the agent and trusted component for continuous monitoring of specified events on the computer platform.

Referring to FIG. 13 herein, there is illustrated a set of process steps applied by the trusted component and agent 511 for monitoring one off special events specified by the user by data entry through dialogue boxes as described herein before. Details of special events to be monitored are specified by the user in step 1300. Details of the particular entity, eg a file application or driver to be monitored are entered in step 1301. In step 1302, details of the event types and entity to be monitored are sent to the agent 511 from the trusted component. The agent then proceeds to continuously monitor for the events on that particular specified entity in step 1303. Periodically, it is checked whether any event has occurred in step 1304 by the agent, and if no event has yet occurred, the agent continues in step 1303 to monitor the specified entity. When an event has occurred, in step 1305 details are passed back to the trusted component in step 1305. The trusted component then applies a cryptographic function to the event data to provide secure event data in step 1306, and in step 1307 writes the secure event data to a memory area either in trusted space or in user space as herein before described with reference to FIG. 12.

The secure event data is a log that can be used, for example, for auditing. An investigator can inspect the log comprised of the secure event data. That investigator can use standard cryptographic techniques to verify the integrity of the event data, and that it is complete. The investigator can then construct a history of the platform. This is useful for investigating attacks on the platform, or alleged improper use of the platform. The event data has been gathered by an impartial entity (the trusted component 260) whose behavior cannot be modified by a user or unilaterally by the owner of the platform. Hence the event log serves as an honest record of activities within the platform. The event log can be published as a report or automatically interpreted by, for example, a computer program that is outside the scope of this invention.

Types of event data which may be stored in the event log include the following. The following lists should be regarded as a non-exhaustive, and in other embodiments of the present invention common variations as will be recognized by those skilled in the art may be made: a time of an event occurring; a date of an event occurring, whether or not a password has been used, if a file is copied, a destination to which the file has been copied to; if a file has been operated on, a size of the file in megabytes; a duration for which a file was open; a duration over which an application has been online; a duration of which a driver has been online; an internet address to which a file has been copied, or to which a driver has accessed, or to which an application has addressed; a network address to which a file has been copied, to which an application has addressed, or to which a driver has corresponded with.

The event data stored in the event log may be physically stored in a data file either on the platform or in the trusted component. The event log data is secured using a chaining function, such that a first secured event data is used to secure a second secured event data, a second secured event data is used to secure a third event data, etc so any changes to the chain of data are apparent.

In addition to providing the secured event log data, the trusted component may also compile a report of events. The report may be displayed on monitor 105. Items which may form the content of a report include the events as specified in the event log above, together with the following: time of an event, date of an event, whether or not a password was used, a destination of the file it is copied to, a size of a file (in megabytes), a duration a file or application has been open, a duration over which a driver has been online, a duration over which a driver has been used, a port which has been used, an internet address which has been communicated with, a network address which has been communicated with.

Agent 511 performs event monitoring operations on behalf of trusted component 2060 however whereas trusted component 260 is resident in a trusted space 513, agent 511 must operate in the user space of the computer platform. Because the agent 511 is in an inherently less secure environment than the trusted space 513, there is the possibility that agent 511 may become compromised by hostile attack to the computer platform through a virus or the like. The trusted component deals with the possibility of such hostile attack by either of two mechanisms. Firstly, in an alternative embodiment the agent 511 may be solely resident within trusted component 260. All operations performed by agent 511 are performed from within trusted user space 513 by the monitoring code component 600 operating through the trusted components' communications interface 700 to collect event data. However, a disadvantage of this approach is that since agent 511 does not exist, it cannot act as a buffer between trusted component 260 and the remaining user space 504.

On the other hand, the code comprising agent 511 can be stored within trusted space in a trusted memory area of trusted component 260, and periodically "launched" into user space 504. That is to say, when a monitoring session is to begin, the agent can be downloaded from the trusted component into the user space or kernel space on the computer platform, where it then resides, performing its continuous monitoring functions. In this second method, which is the best mode contemplated by the inventors, to reduce the risk of any compromises of agent 511 remaining undetected, the trusted component can either re-launch the complete agent from the secure memory area in trusted space into the user space at periodic intervals, and/or can periodically monitor the agent 511 in user space to make sure that it is responding correctly to periodic interrogation by the trusted component.

Where the agent 511 is launched into user space from its permanent residence in trusted space, this is effected by copying code comprising the agent from the trusted component onto the computer platform. Where a monitoring session has a finite monitoring period specified by a user, the period over which the agent 511 exists in user space can be configured to coincide with the period of the monitoring session. That is to say the agent exists for the duration of the monitoring session only, and once the monitoring session is over, the agent can be deleted from user/kernel space. To start a new monitoring session for a new set of events and/or entities, a new agent can be launched into user space for the duration of that monitoring session.

During the monitoring session, which may extend over a prolonged period of days or months as specified by a user, the trusted component monitors the agent itself periodically.

Figure 14:
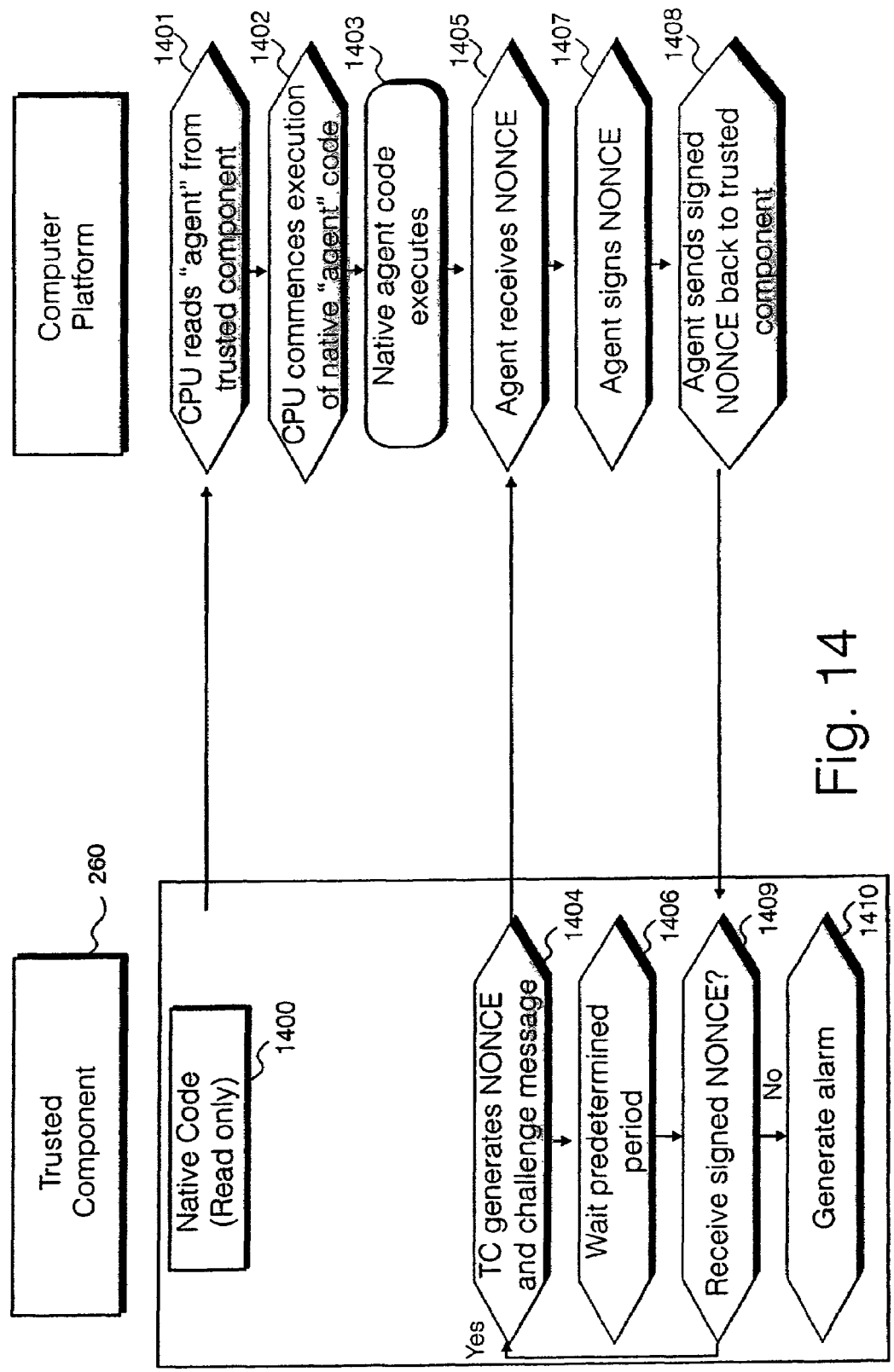
FIG. 14 illustrates schematically process steps carried out by and interaction between the monitoring agent and the trusted component for implementing the agent on the computer platform, and monitoring the existence and integrity of the agent on the computer platform.

Referring to FIG. 14 herein, there is illustrated schematically process steps carried out by trusted component 260 and agent 511 on the computer platform for launching the agent 511 which is downloaded from trusted space to user space, and in which the trusted component monitors the agent 511 once set up and running on the computer platform.

In step 1400, native code comprising the agent 511 stored in the trusted components secure memory area is downloaded onto the computer platform, by the computer platform reading the agent code directly from the trusted component in step 1401. In step 1402, the data processor on the computer platform commences execution of the native agent code resident in user space on the computer platform. The agent continues to operate as described herein before continuously in step 1403. Meanwhile, trusted component 260 generates a nonce challenge message in step 1404 after a suitable selected interval, and sends this nonce to the agent which receives it in step 1405. The nonce may comprise a random bit sequence generated by the trusted component. The purpose of the nonce is to allow the trusted component to check that the agent is still there and is still operating. If the nonce is not returned by the agent, then the trusted component knows that the agent has ceased to operate and/or has been compromised. In step 1407 the agent signs the nonce and in step 1408 the agent sends the signed nonce back to the trusted component. The trusted component receives the signed nonce in step 1409 and then repeats step 1404 sending a new nonce after a pre-selected period. If after a predetermined wait period 1406, commencing when the nonce was sent to the agent in step 1404, the trusted component has not received a nonce returned from the agent, then in step 1410 the trusted component generates an alarm signal which may result in a display on the monitor showing that the agent 511 is incorrectly operating, and that file monitoring operations may have been compromised.

In a second embodiment, trusted component 260 may operate to gather information about the use of data and platform resources with programs using utilities and functions provided by the operating system resident on the computer platform. This information may include access rights, file usage, application usage, memory (RAM) utilization, memory (hard disk) utilization, and main processor instruction cycle allocation statistics.

The prior patent application 'Trusted Computing Platform' describes a method whereby the trusted component cooperates with other entities and reports to them the values of integrity metrics measured by the trusted component. Those other entities then compare the measured metrics with the proper values that are contained in a digital certificate published by a trusted third party. That prior patent application gives an example of a static metric—a digest of the platform's BIOS memory. The measurements made by the method of this application may also be reported as integrity metrics, but because they are potentially always changing, they are called dynamic integrity metrics—a measured value may be different now from the value measured a few seconds previously. Entities must repeatedly request the current value of a measured dynamic metric. For example one integrity metric, according to the best mode described herein, comprises a Boolean value which indicates whether an event which has occurred is apparently incompatible with a policy governing access to data. For example such a Boolean would be TRUE if a mobile software such as a Java applet wrote over files in the user space, even though the mobile software did not have write permission to those files.

Another integrity metric comprises a Boolean value which indicates that unusual behavior has been detected. Such unusual behavior may not necessarily indicate that the computer platform has become unsafe, but may suggest caution in use of the computer platform. Prudent entities communicating with the computer platform may choose not to process very sensitive data on that platform if the second integrity metric indicates that unusual behavior has been detected. Unusual behavior is difficult to accurately define, unless a platform is used to do repetitive operations. In the best mode herein, unusual data may be defined and monitored for by the trusted component as being behavior of a resource on the computer platform which is outside a pre-determined number of standard deviations of a historical mean measurement of behavior compiled over a pre-determined period. For example where a data file has historically over a pre-determined period had a size within a particular range, eg 140–180 megabytes, if the file size increases dramatically, eg to 500 megabytes, and outside a pre-determined number of standard deviations which can be preset, then the second integrity metric Boolean value may change state to a true state, indicating unusual behavior.

As a further example, if an application, eg a word processing application, has a history of saving data files with a frequency in a predetermined range, for example in the range of 1 to 10 saves per day, and the application changes behavior significantly, eg saving 100 saves per day, then a Boolean metric for monitoring that parameter may trigger to a true state.

Of course, as previously mentioned, it may be that the trusted component takes a proactive role in reporting urgent events, instead of waiting to be polled by an integrity challenge. Events can be matched inside the trusted component 260 with policy rules stored inside the trusted component. If an event breaches a rule that the policy considers to be crucial, the trusted component 260 can immediately send an alarm indication message to a relevant entity, and/or display an emergency message to the user on the monitor 105 using the style of dialog box indicated in FIGS. 10 and 11.

The invention claimed is:

1. A computer entity comprising:
   a computer platform comprising a data processor and at least one memory device; and
   a trusted component, said trusted component comprising a data processor and at least one memory device;
   wherein said data processor and said memory of said trusted component are physically and logically distinct from said data processor and memory of said computer platform; and
   a software agent operating on said computer platform, for monitoring at least one event occurring on said computer platform, and reporting said event to said trusted component.

2. The computer entity as claimed in claim 1, wherein said software agent comprises a set of program code normally resident in said memory device of said trusted component, said code being transferred into said computer platform for performing monitoring functions on said computer platform.

3. The computer entity as claimed in claim 1, where said trusted component comprises an event logging component for receiving data describing a plurality of events occurring on said computer platform, and compiling said event data into secure event data.

4. The computer entity as claimed in claim 3, wherein said event logging component comprises means for applying a chaining function to said event data to produce said secure event data.

5. The computer entity as claimed in claim 1, further comprising a display interface for generating an interactive display comprising:

means for selecting an entity of said computer platform to be monitored; and means for selecting at least one event to be monitored.

6. The computer entity as claimed in claim 1, further comprising prediction means for predicting a future value of at least one selected parameter.

7. The computer entity as claimed in claim 1, further comprising a confirmation key means connected to said trusted component, and independent of said computer platform, for confirming to said trusted component an authorisation signal of a user.

8. The computer entity as claimed in claim 1, wherein logical entities to be monitored are selected from the set comprising:

at least one data file;
at least one application; and
at least one driver component.

9. A computer entity comprising:

a computer platform having a first data processor and a first memory device; and a trusted monitoring component comprising a second data processor and a second memory device, wherein said trusted monitoring component stores an agent program resident in said second memory area, said agent program arranged to be copied to said first memory area for performing functions on behalf of said trusted component, under control of said first data processor.

10. A method of monitoring a computer platform comprising a first data processing means and a first memory means, said method comprising:

generating an interactive display for selecting at least one entity comprising said computer platform;
generating a display of events which can be monitored;
generating a display of entities of said computer platform;
selecting at least one said entity;
selecting at least one said event; and
monitoring a said entity for a said event.

11. A computer entity comprising:

a computer platform comprising a first data processor and a first memory device;

a trusted monitoring component comprising a second data processor and a second memory device;

a first computer program resident in said first memory area and operating said first data processor, said first computer program reporting back events concerning operation of said computer platform to said trusted monitoring component; and a second computer program said second computer program resident in said second memory area of said trusted component, said second program operating to monitor an integrity of said first program.

12. The computer entity as claimed in claim 11, wherein said computer program monitors an integrity of said first computer program by sending to said first computer program a plurality of interrogation messages, and monitoring a reply to said interrogation messages made by said first computer program.

13. The computer entity as claimed in claim 12, wherein a said interrogation message is sent in a first format, and returned in a second format, wherein said second format is a secure format.

14. A method of monitoring a computer platform comprising a first data processor and a first memory means, said method comprising:

reading event data describing events occurring on at least one logical or physical entity comprising said computer platform; and securing said event data in a second data processing means having an associated second memory area, said second data processing means, said second memory area being physically and logically distinct from said first data processing means and said first memory area, such that said secure event data cannot be altered without such alteration being apparent.

15. The method as claimed in claim 14, where a said event to be monitored is selected from the set of events comprising:

copying of a data file;
saving a data file;
renaming a data file;
opening a data file;
overwriting a data file;
modifying a data file;
printing a data file;
activating a driver device;
reconfiguring a driver device;
writing to a hard disk drive;
reading a hard disk drive;
opening an application; and
closing an application.

16. The method as claimed in claim 14, wherein a said entity to be monitored is selected from the set comprising:

at least one data file stored on said computer platform;
a driver device of said computer platform; and
an application program resident on said computer platform.

17. The method as claimed in claim 14, wherein said monitoring said entity comprises continuously monitoring a said entity over a pre-selected time period.

18. The method as claimed in claim 14, wherein said monitoring said entity comprises:

monitoring said entity until such time as a pre-selected event occurs on said entity.

19. The method as claimed in claim 14, wherein said monitoring said entity comprises:

monitoring a said entity for a selected event, until a predetermined time period has elapsed.

20. A method of monitoring a computer platform comprising a first data processing means and first memory means, said method comprising:

storing a monitoring program in a second memory area, said second memory area being physically and logically distinct from said first memory area;

transferring said monitoring program from said second memory area to said first memory area;

monitoring at least one entity of said computer platform from within said computer platform; and reporting an event data from said monitoring program to said second data processor.

21. A method of monitoring a computer platform comprising a first data processing and a first memory means, said method comprising:

monitoring at least one entity comprising said computer platform from within said computer platform;

generating an event data describing a plurality of events occurring on said computer platform;

reporting said event data to a second data processing means having an associated second memory means; and processing said event data into a secure format.

* * * * *